(12) United States Patent
Harada

(10) Patent No.: US 10,650,264 B2
(45) Date of Patent: May 12, 2020

(54) IMAGE RECOGNITION APPARATUS, PROCESSING METHOD THEREOF, AND PROGRAM

(71) Applicant: NEC Corporation, Minato-ku, Tokyo (JP)

(72) Inventor: Hiroo Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 117 days.

(21) Appl. No.: 14/893,249

(22) PCT Filed: May 21, 2014

(86) PCT No.: PCT/JP2014/063428
§ 371 (c)(1),
(2) Date: Nov. 23, 2015

(87) PCT Pub. No.: WO2014/192612
PCT Pub. Date: Dec. 4, 2014

(65) Prior Publication Data
US 2016/0125252 A1    May 5, 2016

(30) Foreign Application Priority Data

May 31, 2013   (JP) ................................ 2013-115029

(51) Int. Cl.
*G06K 9/00*    (2006.01)
*G06K 9/32*    (2006.01)
*G06K 9/50*    (2006.01)

(52) U.S. Cl.
CPC ............. *G06K 9/3233* (2013.01); *G06K 9/50* (2013.01)

(58) Field of Classification Search
None
See application file for complete search history.

(56) References Cited

U.S. PATENT DOCUMENTS

2005/0129331 A1   6/2005   Kakiuchi et al.
2006/0209017 A1*  9/2006   Cohen ..................... G06F 3/002
                                                  345/156

(Continued)

FOREIGN PATENT DOCUMENTS

JP        H9146755 A     6/1997
JP     2003-271942 A     9/2003

(Continued)

OTHER PUBLICATIONS

Keisuke Akutsu, Shino Iwashita, "Experimental Study on GUI for the Real World Using Augmented Reality", Technical Report of Institute of Image Information and Television Engineers, Japan (General incorporated association), The Institute of Image Information and Television Engineers, Mar. 1, 2010, vol. 34, No. 11, pp. 55 to 58.

(Continued)

*Primary Examiner* — Sean M Conner
(74) *Attorney, Agent, or Firm* — Wilmer Cutler Pickering Hale and Dorr LLP

(57) ABSTRACT

An image recognition apparatus (100) includes: an object specifying unit (102) that specifies a position, in a captured image, of a detection target object which is set in a predetermined arrangement according to a processing target object in an imaging target and has a feature depending on the processing target object, by image recognition; and a processing unit (104) that specifies, based on object position data indicating a relative position between the detection target object in the imaging target and the processing target object which is set in a predetermined arrangement according to the imaging target and has a feature depending on the imaging target, the processing target object in the captured image which is present at the relative position from the position, in the captured image, of the detection target object (Continued)

specified by the object specifying unit (102), and executes a process allocated to the specified processing target object.

17 Claims, 20 Drawing Sheets

(56) References Cited

U.S. PATENT DOCUMENTS

| | | | | |
|---|---|---|---|---|
| 2007/0242882 | A1* | 10/2007 | Chiba | G06K 9/2063 382/173 |
| 2009/0059007 | A1* | 3/2009 | Wagg | G06K 9/00369 348/157 |
| 2012/0128251 | A1* | 5/2012 | Petrou | G06F 17/30253 382/182 |
| 2013/0036059 | A1 | 2/2013 | Oura et al. | |
| 2013/0117377 | A1* | 5/2013 | Miller | A63F 13/92 709/205 |
| 2013/0325622 | A1* | 12/2013 | Kamitani | G06Q 30/0267 705/14.64 |

FOREIGN PATENT DOCUMENTS

| | | |
|---|---|---|
| JP | 2004-178111 A | 6/2004 |
| JP | 2005-158033 A | 6/2005 |
| JP | 2005-208706 A | 8/2005 |
| JP | 2005-284778 A | 10/2005 |
| JP | 2006-229894 A | 8/2006 |
| JP | 2009-245116 A | 10/2009 |
| JP | 2011-035800 A | 2/2011 |
| JP | 2011-107740 A | 6/2011 |
| JP | 2011-525664 A | 9/2011 |
| JP | 2011-227875 A | 11/2011 |
| JP | 2012-164157 A | 8/2012 |
| JP | 2012-174218 A | 9/2012 |
| JP | 2012-185591 A | 9/2012 |
| JP | 2012-208702 A | 10/2012 |
| WO | 2006/070476 A1 | 7/2006 |
| WO | 2013/012013 A1 | 1/2013 |

OTHER PUBLICATIONS

Japanese Office Action for JP Application No. 2015-519809 dated Nov. 15, 2016 with English Translation.
Japanese Office Action for JP Application No. 2015-519809 dated Jun. 20, 2017.
International Search Report for PCT Application No. PCT/JP2014/063428, dated Jun. 17, 2014.
Japanese Office Action for JP Application No. 2015-519809 dated Aug. 9, 2016 with English Translation.
Azumi, Maruyama, product of subject and art, Image Laboratory, Japan Industrial Publishing Co., Ltd., vol. 21, No. 9, pp. 65-67, 5 pages (Sep. 10, 2010).
Japanese Office Action issued by the Japan Patent Office for Japanese Application No. 2017-089284 dated Apr. 24, 2018 (5 pages).
Japanese Notice of Reasons for Refusal issued in Japanese Patent Application No. 2018-050901, dated May 14, 2019, 8 pages.
Japanese Decision of Refusal issued in Japanese Patent Application No. 2018-050901, dated Oct. 24, 2019, 5 pages.

* cited by examiner

FIG. 6

120 COMMODITY TABLE

| COMMODITY ID |
| --- |
| COMMODITY NAME |
| IMAGE ID |
| MARKER ID |
| PRICE |
| PRICE (INCLUDING TAX) |
| DISCOUNT INFORMATION |
| COUPON INFORMATION |

118 OBJECT POSITION DATA (a)
| DETECTION TARGET OBJECT ID |
| POSITION OF DETECTION TARGET OBJECT IN IMAGING TARGET (OR POSITION OF FEATURE POINT OF DETECTION TARGET OBJECT) |
| PROCESSING TARGET OBJECT ID |
| POSITION OF PROCESSING TARGET OBJECT: RELATIVE POSITION WITH RESPECT TO DETECTION TARGET OBJECT (OR FEATURE POINT THEREOF) |

118 OBJECT POSITION DATA (b)
| POSITION OF DETECTION TARGET OBJECT IN IMAGING TARGET (OR POSITION OF FEATURE POINT THEREOF) |
| POSITION WHERE PROCESS IS EXECUTED: RELATIVE POSITION WITH RESPECT TO DETECTION TARGET OBJECT |

122 OBJECT ASSOCIATION DATA (c)
| DETECTION TARGET OBJECT ID |
| PROCESSING TARGET OBJECT ID |

122 OBJECT ASSOCIATION DATA (d)
| DETECTION TARGET OBJECT ID |
| PROCESS ID |

IMAGE RECOGNITION APPARATUS, PROCESSING METHOD THEREOF, AND PROGRAM

This application is a National Stage Entry of PCT/JP2014/063428 filed on May 21, 2014, which claims priority from Japanese Patent Application 2013-115029 filed on May 31, 2013, the contents of all of which are incorporated herein by reference, in their entirety.

TECHNICAL FIELD

The present invention relates to an image recognition apparatus, a processing method thereof, and a program.

BACKGROUND ART

Generally, when performing image recognition, detection of a detection target is performed by collating a feature value of an image extracted from a captured image with a feature value of a registration image registered in a dictionary in advance.

SUMMARY OF THE INVENTION

Problems to be Solved by the Invention

In such an image recognition technique, the present inventor found the following problems.

For example, when recognizing a menu in a restaurant or an item in a catalog used in a catalog mail-order sale, there may be a case where a photo of a target item is small, a case where an item is pure white with almost no pattern, or a case where only a list is displayed using a character string without a photo. Accordingly, it is difficult to acquire a sufficient quantity of feature information for securing recognition accuracy from a captured image or a registered image of the item, which leads to difficulty in recognition of some of the items.

The present invention is made to solve the above problems, and an object thereof is to provide an image recognition apparatus, a processing method thereof, and a program, which are capable of specifying an object with high accuracy regardless of a recognition target.

Means for Solving the Problems

A first image recognition apparatus of the present invention includes: an object specifying unit that specifies a position, in a captured image, of a detection target object which is set in a predetermined arrangement according to a processing target object in an imaging target and has a feature depending on the processing target object, by image recognition; and a processing unit that specifies, based on object position data indicating a relative position between the detection target object in the imaging target and the processing target object which is set in a predetermined arrangement according to the imaging target and has a feature depending on the imaging target, the processing target object in the captured image which is present at the relative position from the position, in the captured image, of the detection target object specified by the object specifying unit, and executes a process allocated to the specified processing target object.

A second image recognition apparatus of the present invention includes: an object specifying unit that specifies a position, in a captured image, of a detection target object which is set in a predetermined arrangement according to a processing target object in an imaging target and has a feature depending on the processing target object, by image recognition; and a processing unit that specifies, based on object position data in which position information of the detection target object in the imaging target and a processing target object which is set in a predetermined arrangement according to the imaging target and has a feature depending on the imaging target are associated with each other, the associated processing target object in the captured image from the position, in the captured image, of the detection target object specified by the object specifying unit, and executes a process allocated to the specified processing target object.

A first processing method of an image recognition apparatus of the present invention, the method being executed by the image recognition apparatus, the method including:

specifying a position, in a captured image, of a detection target object which is set in a predetermined arrangement according to a processing target object in an imaging target and has a feature depending on the processing target object, by image recognition; and specifying, based on object position data indicating a relative position between the detection target object in the imaging target and the processing target object which is set in a predetermined arrangement according to the imaging target and has a feature depending on the imaging target, the processing target object in the captured image which is present at the relative position from the position of the specified detection target object in the captured image, and executing a process allocated to the specified processing target object.

A second processing method of an image recognition apparatus of the present invention, the method being executed by the image recognition apparatus, the method including:

specifying a position, in a captured image, of a detection target object which is set in a predetermined arrangement according to a processing target object in an imaging target and has a feature depending on the processing target object, by image recognition; and specifying, based on object position data in which position information of the detection target object in the imaging target and a processing target object which is set in a predetermined arrangement according to the imaging target and has a feature depending on the imaging target are associated with each other, the associated processing target object in the captured image from the position of the specified detection target object in the captured image, and executing a process allocated to the specified processing target object.

A first computer program of the present invention is a program for causing a computer to execute: a procedure for specifying a position, in a captured image, of a detection target object which is set in a predetermined arrangement according to a processing target object in an imaging target and has a feature depending on the processing target object, by image recognition; and a procedure for specifying, based on object position data indicating a relative position between the detection target object in the imaging target and the processing target object which is set in a predetermined arrangement according to the imaging target and has a feature depending on the imaging target, the processing target object in the captured image which is present at the relative position from the position of the specified detection target object in the captured image, and executing a process allocated to the specified processing target object.

A second computer program of the present invention is a program for causing a computer to execute: a procedure for specifying a position, in a captured image, of a detection target object which is set in a predetermined arrangement according to a processing target object in an imaging target and has a feature depending on the processing target object, by image recognition; and a procedure for specifying, based on object position data in which position information of the detection target object in the imaging target and the processing target object which is set in a predetermined arrangement according to the imaging target and has a feature depending on the imaging target are associated with each other, the associated processing target object in the captured image from the position of the specified detection target object in the captured image, and executing a process allocated to the specified processing target object.

Meanwhile, note that those obtained by converting any combination of the foregoing components and the representation of the present invention between a method, a device, a system, a recording medium, a computer program, and the like are also effective as aspects of the present invention.

In addition, various types of components of the present invention are not necessarily required to be present individually and independently, but a plurality of components may be formed as one member, one component may be formed by a plurality of members, a certain component may be a portion of another component, a portion of a certain component and a portion of another component may be the same as each other, or the like.

In addition, a plurality of procedures are described in order in the processing method and the computer program of the present invention, but the order of the description is not intended to limit the order of the execution of the plurality of procedures. Therefore, when the processing method and the computer program of the present invention are executed, the order of the plurality of procedures may be changed within the range of not causing any problem in terms of the contents.

Further, the plurality of procedures of the processing method and the computer program of the present invention are not limited to being individually executed at timings different from each other. Therefore, another procedure may occur during the execution of a certain procedure, the execution timing of a certain procedure and a portion or all of the execution timings of another procedure may overlap each other, or the like.

Effects of the Invention

According to the present invention, there are provided an image recognition apparatus capable of specifying a detection target with high accuracy regardless of a recognition target, and a processing method thereof, and a program.

BRIEF DESCRIPTION OF THE DRAWINGS

The above-mentioned objects, other objects, features and advantages will be made clearer from the preferred exemplary embodiments described below, and the following accompanying drawings.

FIG. 6 is a diagram illustrating a configuration example of a commodity table of an image recognition apparatus according to an exemplary embodiment of the present invention.

FIG. 20 are diagrams illustrating an example of object position data stored in a database of an image recognition apparatus according to an exemplary embodiment of the present invention.

DESCRIPTION OF EXEMPLARY EMBODIMENTS

Figure 1:
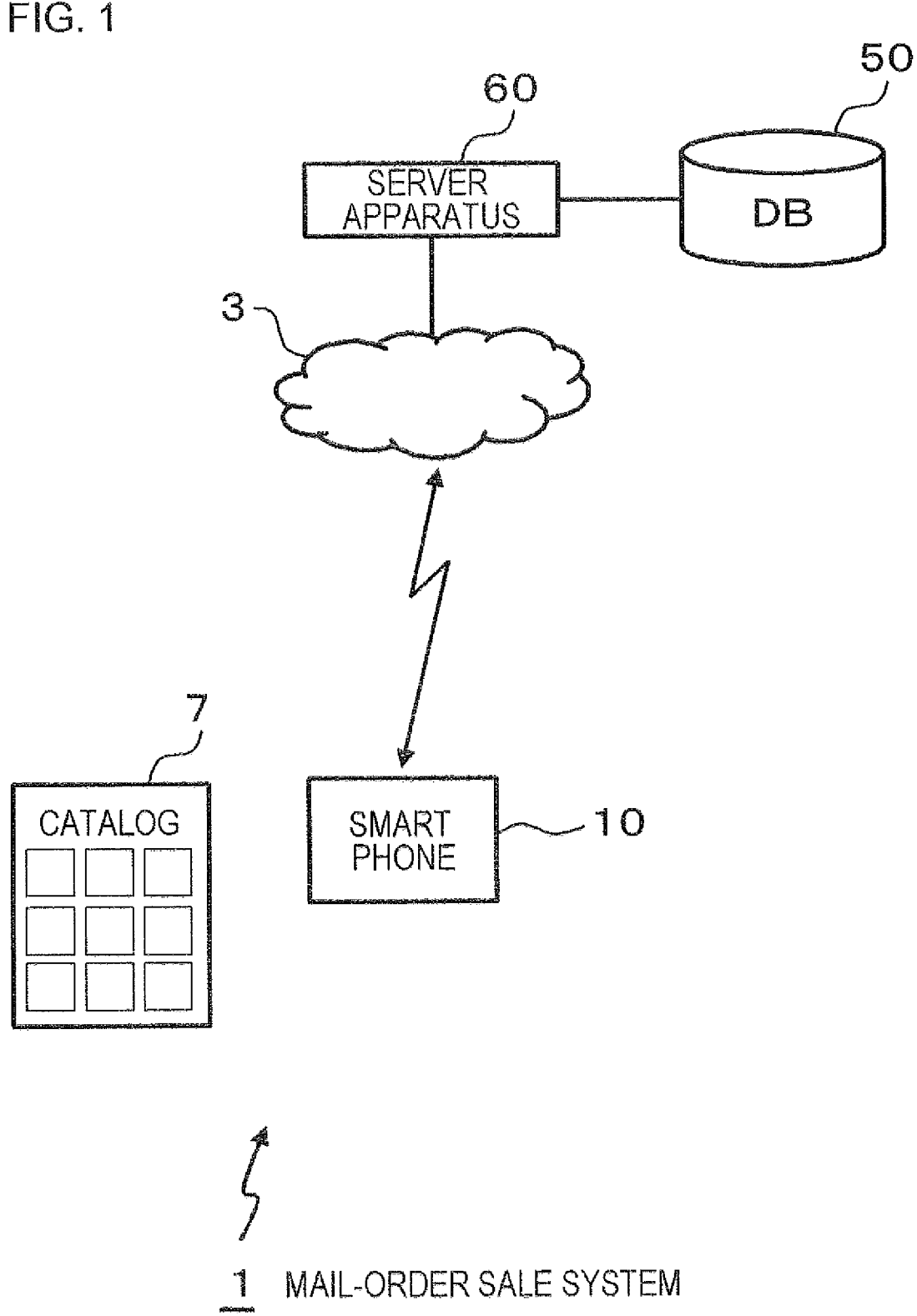
FIG. 1 is a block diagram illustrating a configuration example of a mail-order sale system using an image recognition apparatus according to an exemplary embodiment of the present invention.

Hereinafter, exemplary embodiments of the present invention will be described with reference to the accompanying drawings. In the all drawings, the similar reference numerals are given to the similar components, and description thereof will not be repeated.

(First Exemplary Embodiment)

FIG. 1 is a block diagram illustrating a configuration example of a mail-order sale system 1 as an example of a system using an image recognition apparatus according to an exemplary embodiment of the present invention.

The mail-order sale system 1 of this exemplary embodiment includes a smart phone 10 which is a portable terminal used by a user, a server apparatus 60 capable of communicating with the smart phone 10 through a network 3, and a database 50 (represented as "DB" in the drawings) connected to the server apparatus 60.

Figure 2:
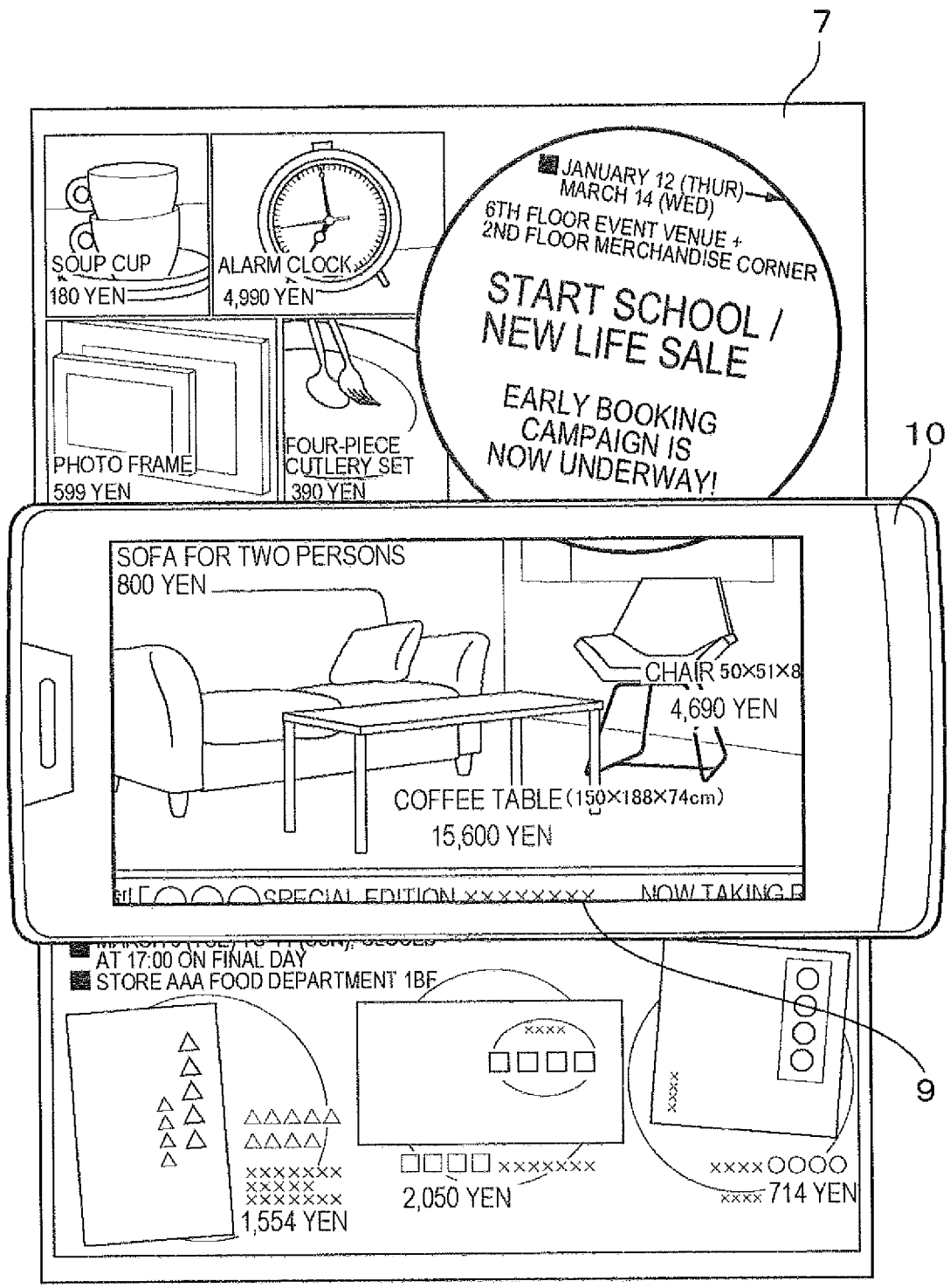
FIG. 2 is a diagram illustrating a state when a catalog is imaged using an image recognition apparatus according to an exemplary embodiment of the present invention.

The image recognition apparatus of the present invention recognizes each element of an image recognition target included in an imaging target, and performs a process corresponding to each recognized element. In the example of the mail-order sale system 1 according to the exemplary embodiment of the present invention, as shown in FIG. 2, when a user puts a portable terminal such as a smart phone 10 over a catalog 7 to image the catalog 7 and commodities (respective elements of the image recognition target) in the catalog 7 (imaging target) are recognized, the smart phone 10 may perform a process of displaying a marker on a screen, a process of opening a web site for viewing information relating to the commodity, or a process of receiving an order process of the commodity, as the process corresponding to the recognized commodity. The user can view the commodity information on a preview screen 9 of a video image displayed in real time using the smart phone 10 and then place an order.

As described later in detail for each component, the image recognition apparatus according to the exemplary embodiment of the present invention may be realized by the portable terminal (smart phone 10) or the server apparatus 60 capable of communicating with the portable terminal (smart phone 10), or a combination thereof.

Figure 3:
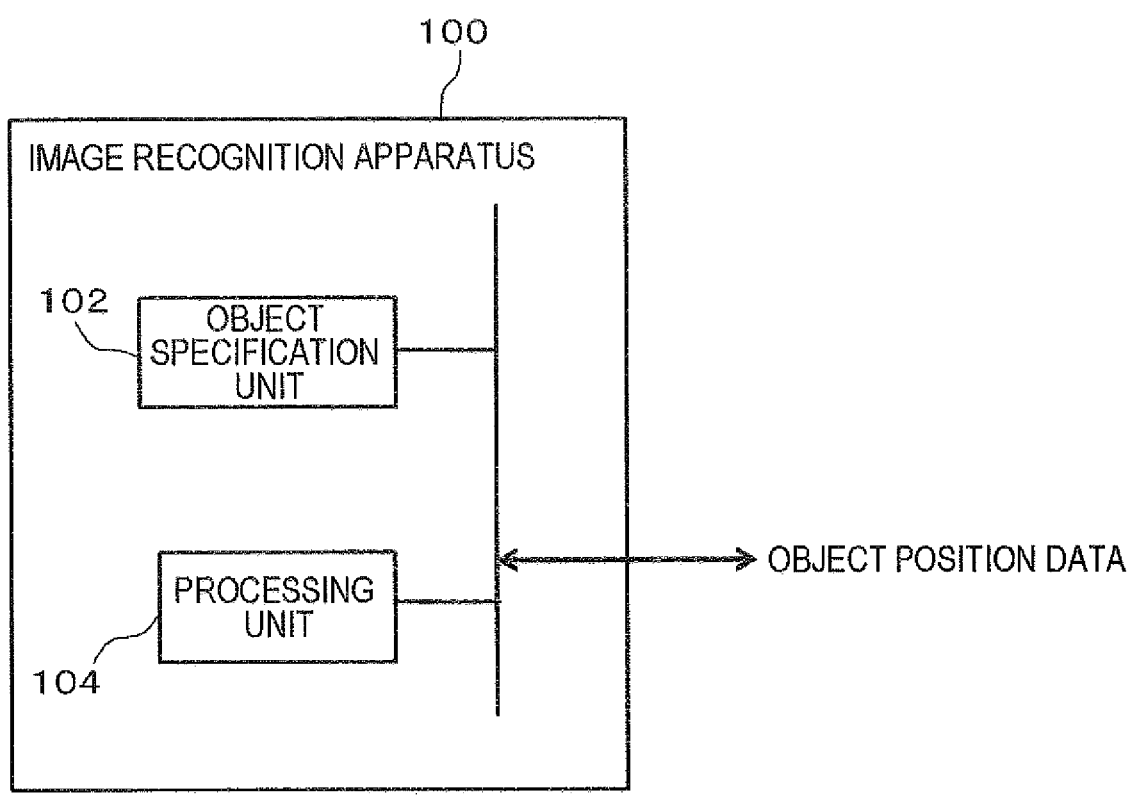
FIG. 3 is a functional block diagram illustrating a configuration of an image recognition apparatus according to an exemplary embodiment of the present invention.

FIG. 3 is a functional block diagram illustrating a configuration of an image recognition apparatus 100 according to an exemplary embodiment of the present invention.

The image recognition apparatus 100 according to the exemplary embodiment of the present invention includes an object specifying unit 102 that specifies a position, in a captured image, of a detection target object which is set in a predetermined arrangement according to a processing target object in an imaging target and has a feature depending on the processing target object, by image recognition; and a processing unit 104 that specifies, based on object position data in which position information of the detection target object in the imaging target and the processing target object which is set in a predetermined arrangement according to the imaging target and has a feature depending on the imaging target are associated with each other, the associated processing target object in the captured image from the position, in the captured image, of the detection target object specified by the object specifying unit 102, and performs a process allocated to the specified processing target object.

Respective terms in the present invention are defined as follows, but are not limited thereto.

The imaging target refers to a target to be captured using a terminal such as a smart phone 10 by a user or the like. As described above, the imaging target is a sheet of a booklet or the like such as a mail-order sale catalog. The imaging target includes a recognition target which is viewed by a user in the imaging target. For example, a commodity or the like disclosed in the catalog corresponds to the recognition target.

In the present invention, the imaging target includes a processing target object to which a certain process is allocated, and a detection target object which is detected by the image recognition apparatus 100 by image recognition. Although described in detail later, the processing target object is an object capable of being viewed and recognized by a user, such as a commodity image in a catalog, which is a typical example, but the processing target object is not limited thereto. For example, an entire sheet of only a background image may be set as the processing target object. Further, it is sufficient if the detection target object has a feature value capable of being detected by the image recognition apparatus 100 by image recognition, regardless of whether a person can recognize the detection object.

The detection target object and the processing target object may be at least partially the same, or may be totally different objects. Here, considering that a user recognizes an image of the processing target object and captures the recognized image, it is necessary that the detection target object is included in an imaging range of an imaging unit of the user when the processing target object is imaged. That is, the detection target object is set so that at least a part of the processing target object and at least a part of the detection target object associated with the processing target object are included within the same imaging range. However, since the detection target object may be associated with plural processing target objects, a processing target object that is not included in the imaging range may also be specified as a processing target object corresponding to the specified detection target object.

The imaging target may be variously provided according to application fields of the image recognition apparatus of the present invention. For example, the imaging target may be a paper medium such as a catalog, a leaflet, a menu of a restaurant, a travel guide, a town guide, an event announcement leaflet, a sheet of newspaper, an insert, a magazine advertisement, a magazine article, a comic magazine book, a book, a coupon magazine, a catalog of commodities or services, an instruction book, a map, a commodity package, a poster, a hanging advertisement, or the like. As for the rest, the imaging target may be at least one of a commodity or a model displayed in a show window or a display shelf, a pop display, a screen of a digital catalog, an online shopping web site or the like displayed on a display of a terminal such as or a personal computer, a sign installed in the street or a shop, a screen displayed in a digital signage installed in the street or a shop, a TV screen on which a shopping program is displayed, a floor guide map of a building, a shopping mall, a train station or the like, a landscape (scene or building) seen from a specific point, an art object such as a picture, and the like.

In an example other than a mail-order sale, for example, a process of recognizing a menu of a restaurant and displaying information relating to the recognized menu, for example, allergy information, displaying coupon information or a recommendation menu, or taking an order of the menu may be performed. In an example where a floor guide map is recognized, a process of displaying information relating to a building, for example, a telephone number, a process of opening a web site, a process of presenting navigation to the building, or a process of displaying sale information of each shop may be performed.

The processing target object refers to an object (an object, an image, a character string, or the like presented in the imaging target) recognized by a user, which is included in the imaging target, and to which a certain process is allocated. As a typical example thereof, for example, the processing target object, is an individual commodity image or the like printed on a sheet of a catalog. That is, the processing target object is a target (for example, a commodity image) that is recognized by a user when viewing a catalog which is an imaging target, for which the user wants to obtain information or to perform a purchasing procedure. From the standpoint of the system, the processing target object is a target to be recognized and imaged by a user, for which an associated process is to be performed. However, in view of the captured image, the processing target object may not be recognized with specific recognition accuracy by image recognition. Accordingly, the image recognition apparatus of this exemplary embodiment has a configuration in which a detection target object, described later, is detected from a captured image and a processing target object is specified from the detected detection target object, so that a process associated with the specified processing target object may be performed.

The processing target object may include various objects according to application fields of the image recognition apparatus of the present invention. For example, the processing target object may include an article which is a commodity, or an article not for sale such as an exhibit or a prototype product. Further, the processing target object may include a logo mark, a symbol mark, an icon, a character string, a photo, a design, or the like indicating options of an article, for example, designation of a type, color, pattern, size, name printing, or the like of the article, optional components that form the article, for example, aero parts of an automobile and a combination thereof, and the like. Further, the processing target object may include a logo mark, a symbol mark, an icon, a character string, a photo, a design, or the like indicating sale options of an article, for example, selection of commodity delivery date and time, designation of a commodity assembly service, designation of a gift package or a gift wrapping paper, or the like. Further, the processing target object may include a logo mark, a symbol mark, an icon, a character string, a photo, a design, or the like indicating services provided by a variety of businesses, options of the services, designation of date and time for the services, nomination of a person in charge, or the like, in addition to the article. Further, the processing target object may include a logo mark, a symbol mark, an icon, a character string, a photo, a design, or the like indicating each choice when plural choices are presented to a user and one or more arbitrary choices are designated by the user, for example, when a user selects choices or the like for reply of a questionnaire or a quiz.

Figure 19:
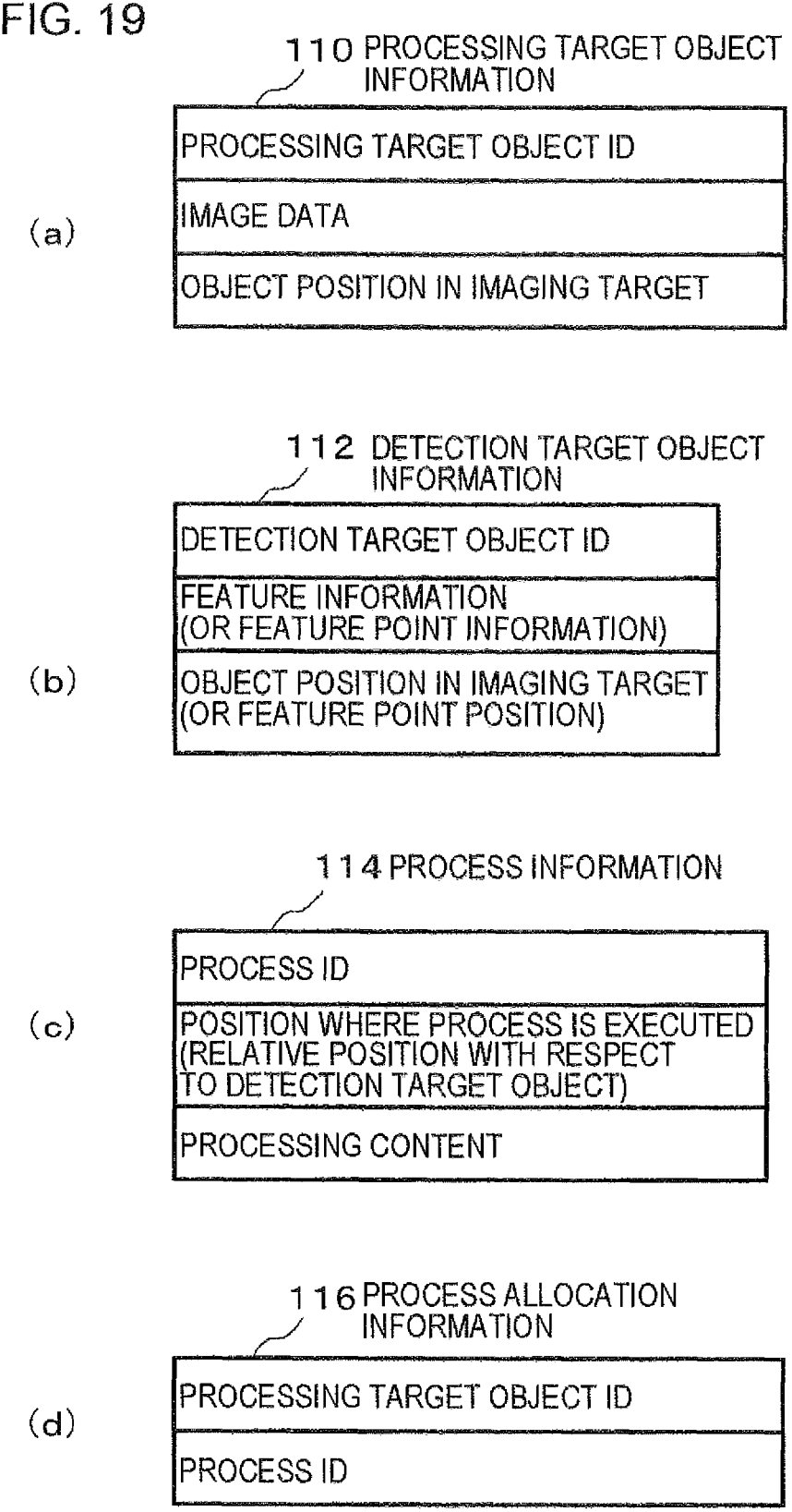
FIG. 19 are diagrams illustrating an example of structures of a variety of information stored in a database of an image recognition apparatus according to an exemplary embodiment of the present invention.

As shown in FIG. 19(a), processing target object information 110 includes an ID for identifying a processing target object, image data (a file name, a storage location of the image data, and the like), and the position of the processing target object in an imaging target. The processing target object information 110 may be stored in the database 50 shown in FIG. 1. Both the object ID and the image data are not essential information, and at least one thereof may be provided. Alternatively, instead, the object ID and the image data may be other information represented by an image of the processing target object, for example, commodity information (a commodity ID, a commodity name, a model number, price, specification, description of a commodity, or the like, or, a URL of a web page where the commodity information is disclosed, or the like). As described later, in the image recognition apparatus 100 of this exemplary embodiment, the processing target object information 110 is not essential. It is sufficient if information about the processing target object is stored at least as object position data indicating a relative position of the processing target object with respect to the position of the detection target object.

The present invention is particularly effective when a positional relationship between at least a part of the processing target object and at least a part of the detection target object included in the imaging target is fixed. However, a case where an imaging target is a video image and a relative position of a processing target object or a detection target object included in the imaging target is changed, such as a digital signage, is not excluded from the present invention. In such a case, the image recognition apparatus may prepare information for recognizing a change, for each reproduction time, of a relative positional relationship between at least a part of the processing target object and at least a part of the detection target object in the video image. With this configuration, the image recognition apparatus can obtain the relative positional relationship between at least a part of the processing target object and at least a part of the detection target object included in the imaging target based on the reproduction time of the video image at a time point of imaging.

The detection target object refers to a target which is included in an imaging target and is detected from a captured image obtained by imaging the imaging target by image recognition. The detection target object is set in a predetermined arrangement according to a processing target object, and has a feature depending on the processing target object. For example, when a user images an imaging target in which a processing target object is included, it is preferable that a region within the imaging target from which sufficient feature information can be extracted to obtain specific recognition accuracy by image recognition is set as the detection target object. Further, the detection target object may include or may not include at least a part of the processing target object. However, as described above, since a user aims at the processing target object for imaging, the detection target object is set in the imaging target so that at least a part of the detection target object associated with the processing target object is included in an imaging range when the processing target object is imaged. Alternatively, as described later, the detection target object may be embedded in advance in the imaging target so that the detection target object is arranged to maintain a predetermined relationship with the processing target object in the imaging target and visibility of the processing target object does not deteriorate.

For example, when an image of a processing target object (commodity) in an imaging target (a sheet of a catalog) is small or is pure white with almost no pattern, even though feature information of the processing target object is extracted from a captured image, it is difficult to obtain sufficient information for securing recognition accuracy by collation with a commodity image registered in advance. Accordingly, it is difficult to recognize such a processing target object from the captured image. Thus, in the present invention, a detection target object is set in the imaging target so that feature information for securing specific recognition accuracy can be obtained from the captured image. The detection target object of the present invention may be changed in its arrangement, range, feature information value, or the like according to the processing target object included in the imaging target, differently from a general marker (for example, markers provided in four corners of a target frame) provided for position detection of the imaging target, and a user may be prevented from recognizing the existence thereof. A variety of setting methods of the detection target object may be considered, as described in detail later in exemplary embodiments.

Further, the detection target object may be indicated by feature information in at least a part of an image region included in an imaging target. The feature information may be image data in the corresponding region, or may be feature information extracted or generated for image recognition based on the image region. The feature information is a feature value of the image region, and for example, may be the ratio of a red component included in the image region, or an average luminance of the image region. Alternatively, the feature information may be a distribution (position or number) of feature points extracted under a predetermined condition in the image region, and may include information indicating the condition under which each extracted feature point is extracted, for example. Since the feature information may include various aspects according to image recognition methods, appropriate information may be employed according to a method to be used.

As shown in FIG. 19(b), in this exemplary embodiment, for example, detection target object information 112 includes an ID for identifying a detection target object, feature information of the detection target object (or information about plural feature points included in the detection target object), and the position of the detection target object in an imaging target (the positions of plural feature points included in the detection target object in the imaging target). The detection target object information 112 may be stored in the database 50 shown in FIG. 1.

Here, the captured image refers to an image obtained by imaging the imaging target. The captured image obtained by imaging the imaging target at least includes a part of a processing target object recognized by a user, and may further include a background. Further, it is preferable that the captured image includes at least a part of the detection target object in a range of specific image recognition accuracy.

The object position data represents a relative position (which may be an arrangement and a range) between a detection target object and a processing target object in an imaging target or a captured image. That is, the object position data is data for specifying the processing target object which is in a relative position in the captured image, from the position of the detection target object in the captured image obtained by imaging the imaging target. A specific example thereof will be described later.

Here, in the case of a captured image obtained by imaging a part of an imaging target, a processing target object which is included in the imaging target but is not included in the captured image, among the processing target objects capable of being specified from the position of the detection target object in the captured image, may also be specified. The object position data may at least include connection information indicating a correspondence relationship between the detection target object and the processing target object. The correspondence relationship between the detection target object and the processing target object includes at least one of a one-to-one, one-to-plural, plural-to-one, and plural-to-plural relationships.

The process allocated to the processing target object may include at least one of display of various items such as a marker, a menu, an icon, or an operating button (operation reception), realization of a user interface function, transmission of a detection result to a server, window operation, and the like. Here, the marker is displayed being superimposed on an image by a process of surrounding a commodity image using a line, reverse-displaying information about a commodity name or the like, or blink-displaying or highlight-displaying an image or information, for example, in order to show a commodity image to the user as if the commodity image is recognized. Further, the marker may be displayed in a balloon shape, so that information relating to a processing target object may be displayed therein, and may include an operating button for receiving a process such as purchasing. The menu, the icon, the operating button, or the like is provided for receiving an execution instruction of a predetermined process allocated to the processing target object from the user, and may receive designation of a processing condition or the like with the execution instruction.

As for the rest, upon receiving a recognition result of the processing target object, the process may include a process of jumping to a predetermined URL address allocated to the processing target object automatically or by receiving operation of a user, thereby causing a web site to be browsed, a process of starting up or ending a predetermined application, a process of opening, switching, or closing an another window, for example.

In this exemplary embodiment, as shown in FIG. 19(c), processing information 114 of a process allocated to a processing target object includes an ID for identifying the process, a position where the process is executed in a captured image (or a relative position with respect to a detection target object), and processing content. The processing information 114 may be stored in the database 50 shown in FIG. 1. Further, as shown in FIG. 19(d), process allocation information 116 may be stored as information for association of the process allocated to each processing target object in the database 50 shown in FIG. 1 so as to be associated with a process ID of the process allocated to the processing target object for each processing target object ID of the processing target object. The processing target object and the process are not only in a one-to-one relationship, but may also be in a plural-to-one, one-to-plural, or plural-to-plural relationship, or in a relationship of a combination thereof.

Further, in this exemplary embodiment, the smart phone 10 is described as an example of a portable terminal used by a user, but the present invention is not limited thereto. For example, a portable mobile wireless communication terminal such as a mobile phone, a personal digital assistant (PDA), a tablet terminal, a game machine, or another electronic device, instead of the smart phone, may be used. Further, the portable terminal of the present invention may be a portable terminal provided at a shop, a commodity exhibition site, or the like, instead of a portable terminal carried by a user, and in this case, may be a terminal capable of being commonly used by users who visit the shop or the commodity exhibition site.

Hereinafter, in this exemplary embodiment, an example where a user orders a commodity from a catalog 7 using the smart phone 10 will be described. Specifically, the image recognition apparatus according to the exemplary embodiment of the present invention images, at least part by part, an imaging target in which plural processing target objects are arranged in parallel while changing a direction or a position of a camera. Further, a user images processing target objects for image recognition while sequentially viewing portable-sized screens such as the smart phone 10. In the present invention, the user recognizes and images a processing target object, but the image recognition apparatus 100 recognizes a detection target object by image recognition. Further, when the image recognition apparatus 100 can recognize a detection target object, as if the image recognition apparatus 100 can recognize a processing target object, the image recognition apparatus 100 displays the processing target object with a marker being attached thereto, for example, and notifies the user of the result. Further, information corresponding to the processing target object specified by the image recognition apparatus 100 may be displayed on a touch panel of the smart phone 10 in association with the processing target object, or an operation of ordering or the like may be received on the touch panel of the smart phone 10.

Figure 4:
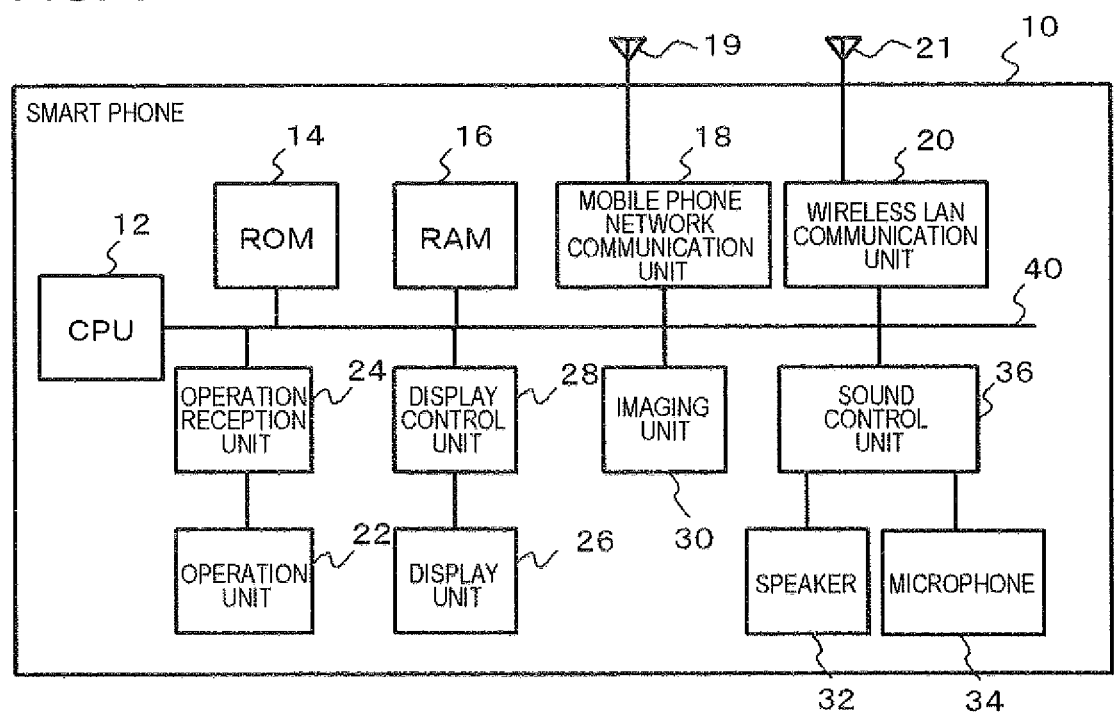
FIG. 4 is a block diagram illustrating a hardware configuration of a smart phone as an example of a portable terminal that forms an image recognition apparatus according to an exemplary embodiment of the present invention.

FIG. 4 is a block diagram illustrating a hardware configuration of the smart phone 10 as an example of a portable terminal that forms the image recognition apparatus 100 according to the exemplary embodiment of the present invention. As shown in FIG. 4, the smart phone 10 in this exemplary embodiment includes a central processing unit (CPU) 12, a read only memory (ROM) 14, a random access memory (RAM) 16, a mobile phone network communication unit 18, a wireless local area network (LAN) communication unit 20, an operation unit 22, an operation reception unit 24, a display unit 26, a display control unit 28, an imaging unit 30, a speaker 32, a microphone 34, and a sound control unit 36.

The CPU 12 is connected to each component of the smart phone 10 through a bus 40, and controls the entirety of the smart phone 10 together with each component. The ROM 14 stores a program for operating the smart phone 10 or various application programs, a variety of setting data used when the programs are operated, and the like, and stores user data including address data and a variety of content data. The RAM 16 has an area where data is temporarily stored, such as a work area for operation of the program.

The respective components of the smart phone 10 are realized by an arbitrary combination of hardware and software of an arbitrary computer that includes the CPU 12, the RAM 16, a program that realizes the components shown in FIG. 3, loaded to the RAM 16, the ROM 14 that stores the program, and a network connection interface (the mobile phone network communication unit 18 and the wireless LAN communication unit 20) described above. Further, those skilled in the art can understand that various modification examples may be provided as a method and an apparatus for the realization. The respective diagrams described below do not represent configurations in the unit of hardware, but represent blocks in the unit of functions.

The ROM 14 and RAM 16 may be replaced with other devices having a function for storing an application program, setting data or temporary storage data for operating the program, user data, or the like, such as a flash memory or a disk drive.

The operation unit 22 includes operating keys, operating buttons, a switch, a jog dial, a touch-pad, a touch panel which is integrally formed with the display unit 26, or the like. The operation reception unit 24 receives an operation of a user through the operation unit 22, and notifies the CPU 12 of the operation. The display unit 26 includes a light emitting diode (LED) display, a liquid crystal display, an organic electroluminescence (EL) display, or the like. The display control unit 28 performs a variety of screen display in the display unit 26 according to an instruction from the CPU 12. The sound control unit 36 performs sound output through the speaker 32 and sound input through the microphone 34 according to an instruction from the CPU 12.

The mobile phone network communication unit 18 is connected to a portable communication network (not shown) through a base station (not shown) in a 3G (third generation mobile phone) manner, for example, through a mobile phone network antenna 19 for communication. The smart phone 10 is connected to the network 3 (FIG. 1) such as the Internet through the portable communication network to communicate with the server apparatus 60 (FIG. 1).

The wireless LAN communication unit 20 performs wireless LAN communication with a relay device (not shown) in a mode based on the IEEE 802.11 standard, for example, through a wireless LAN antenna 21. In this exemplary embodiment, the smart phone 10 may perform wireless LAN communication with a relay device (not shown) installed indoor by the wireless LAN communication unit 20 to be connected to a home network (not shown), and may be connected to the network 3 (FIG. 1) such as the Internet through the home network to communicate with the server apparatus 60 (FIG. 1).

The smart phone 10 may be installed with an application program for realization of the image recognition apparatus 100 according to the exemplary embodiment of the present invention in advance and may execute the application program, to thereby realize at least a part of the functions of the image recognition apparatus 100. Alternatively, a web page may be provided on a web server (not shown) so that a user performs access using the smart phone 10, and the smart phone 10 may use the functions of the image recognition apparatus 100.

Figure 5:
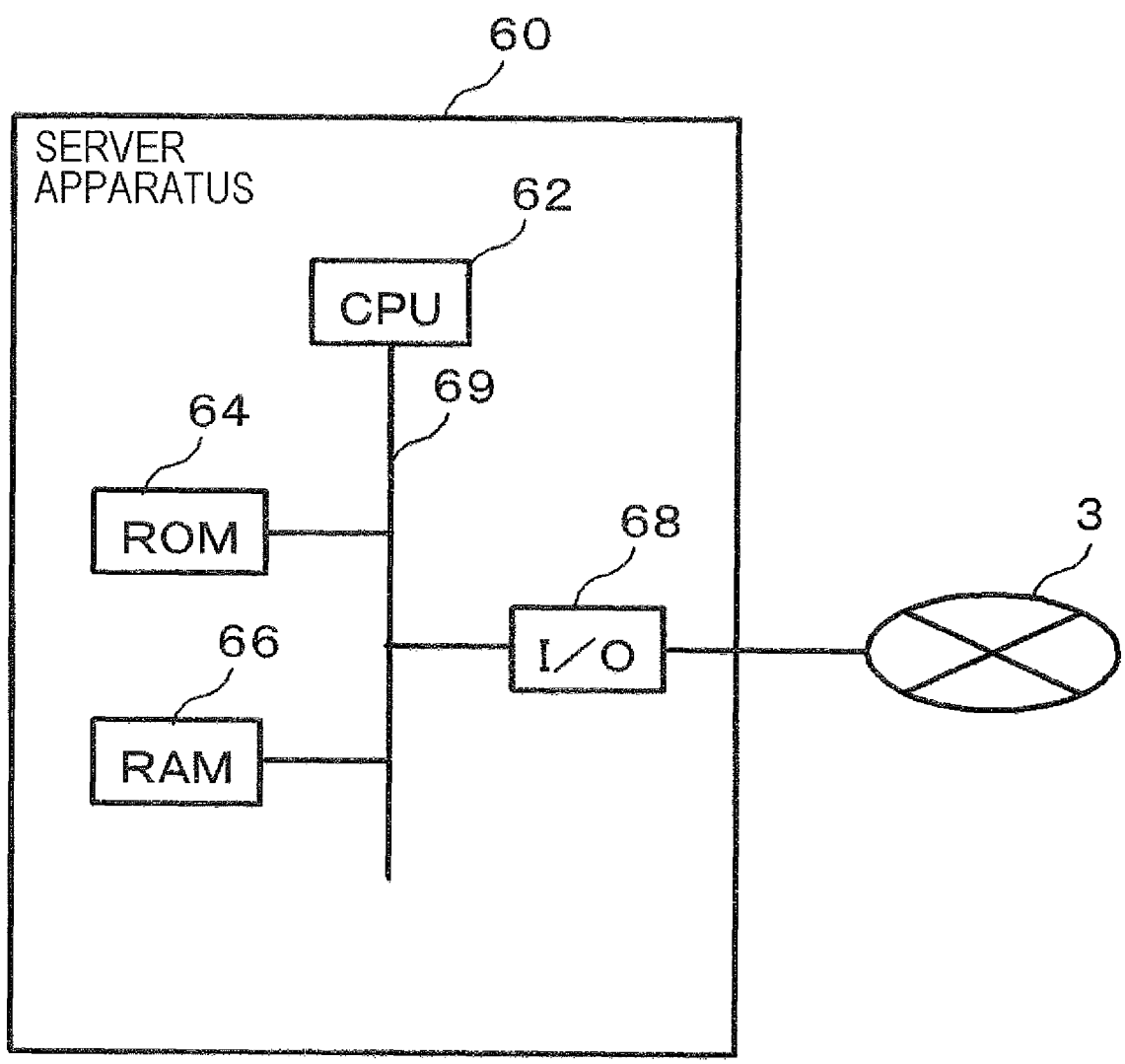
FIG. 5 is a block diagram illustrating a hardware configuration of a server apparatus that forms an image recognition apparatus according to an exemplary embodiment of the present invention.

FIG. 5 is a block diagram illustrating a hardware configuration of the server apparatus 60 that forms the image recognition apparatus 100 according to the exemplary embodiment of the present invention.

The server apparatus 60 in this exemplary embodiment may be realized by a server computer or a personal computer connected to the database 50 (FIG. 1), or an apparatus corresponding thereto. Further, the server apparatus 60 may be configured by a virtual server or the like.

Respective components of the server apparatus 60 of the mail-order sale system 1 in this exemplary embodiment are realized by an arbitrary combination of hardware and software of an arbitrary computer that includes a CPU 62, a RAM 66, a program for realizing components shown in the figure, loaded to the RAM 66, a ROM 64 that stores the program, and an input/output (I/O) 68 that includes a network connection interface. The CPU 62 is connected to each component of the server apparatus 60 through a bus 69, and controls the entirety of the server apparatus 60 together with each element. Further, those skilled in the art can understand that various modification examples may be provided as a method and an apparatus for the realization. The respective diagrams described below do not represent configurations in the unit of hardware, but represent blocks in the unit of functions. The server apparatus 60 may be connected to an input/output device (not shown) through the I/O 68.

In this exemplary embodiment, the smart phone 10 sequentially acquires video image data obtained by imaging at least a part of an imaging target (catalog 7 in FIG. 2) that presents images of plural commodities by the imaging unit 30 (FIG. 4). For example, the user puts the smart phone 10 over the catalog 7 to cause at least a part of the images of the plural commodities presented in the catalog 7 or the like to be live-view-displayed on the preview screen 9 (FIG. 2) as a real time video image in the display unit 26 (FIG. 4) of the smart phone 10.

For example, in the case of the smart phone 10 in this exemplary embodiment, the size of video image data is that displayed on a portable-terminal-sized screen of the smart phone 10.

The smart phone 10 in the exemplary embodiment has a configuration in which the imaging unit is realized by a built-in or connected camera, but the present invention is not limited thereto. In another exemplary embodiment, the imaging unit may be realized by the server apparatus 60. Video image data acquired by the imaging unit of the server apparatus 60 may be streaming-delivered to the smart phone 10 of the user, and may be displayed in the display unit 26 (FIG. 4) of the smart phone 10. Further, the video image data captured by on the side of the server apparatus 60 may be streaming-delivered to the smart phone 10 for display while operating the server apparatus 60 by remote control on the side of the smart phone 10 to handle a video image. Alternatively, remote control from the smart phone 10 may cause the video image obtained by imaging a show window of a shop with a live camera to be streaming-delivered to the smart phone 10 through the server apparatus 60 for display.

In the image recognition apparatus 100 according to the exemplary embodiment of the present invention, the above-described object position data may also be stored in the database 50.

As shown in FIG. 20(a), object position data 118 may be stored in association with a detection target object ID in an imaging target, positional information thereof (or positions of plural feature points included in a detection target object), a processing target object ID associated with the detection target object, and a relative position between the detection target object and the processing target object (or a relative position between the positions of the feature points included in the detection target object and the processing target object), for example.

Here, position information about the detection target object may be represented as at least one of the following types of information or a combination thereof.

(a1) information indicating an absolute position of an image region (for example, using coordinates of a predetermined position (center of gravity, center, end points, or the like) in the image region, or the like) corresponding to at least one detection target object in an imaging target.

(a2) information indicating absolute positions (for example, using coordinates or the like), in an imaging target, of plural feature points included in an image region corresponding to a detection target object in the imaging target.

(a3) information indicating a relative position (for example, using a vector quantity, and the like indicating a feature value and a positional relationship) between image regions corresponding to plural detection target objects in an imaging target.

For example, when a sheet of a magazine is the imaging target, a lower left corner on the sheet of the magazine may be set as a reference point (0, 0) of a coordinate axis, and in a case of (a1), centers of gravity of two image regions R1 and R2 corresponding to detection target objects arranged on the sheet may be represented as coordinates (x1, y1) and (x2, y2), respectively. In a case of (a2), for example, positions of plural feature points: f11, f12, and f13; and f21 and f22, which are respectively included in the image regions R1 and R2 corresponding to the detection target objects may be represented as coordinates: (x11, y11), (x12, y12), and (x13, y13); and (x21, y21) and (x22, y22), respectively. The number of image regions corresponding to the detection target objects or the number of feature points is not limited thereto.

In a case of (a3), for example, a relative position between the centers of gravities of the image regions R1 and T2 may be mutually represented by vectors indicating the direction and length of a straight line connecting the coordinates (x1, y1) and (x2, y2) of the centers of gravities of the image regions R1 and R2 corresponding to the detection target objects. Further, feature values of the image regions R1 and R2 may be included in vectors, respectively.

Further, information indicating the position of the target processing object may be represented as at least one of the following types of information or a combination thereof.

(b1) information indicating an absolute position (for example, using coordinates of a predetermined position (center of gravity, center, end points, or the like) in the image region) of an image region of a processing target object in an imaging target.

(b2) information indicating a position in an imaging target or a captured image, for execution of a process allocated to a processing target object (for example, using coordinates or the like).

(b3) information indicating a relative position (for example, using a vector quantity, and the like indicating a feature value and a positional relationship) between image regions of plural processing target objects in an imaging target.

Further, in the example of FIG. 20(a), in the object position data 118, information indicating a detection target object which is a target of which position data is stored is a detection target object ID, but the present invention is not limited thereto. For example, the information may include at least one of image data itself of an image region of the detection target object, a storage location and a file name (path) of the image data which is separately stored, feature information about the image region of the detection target object, and information about plural feature points included in the image region, or may include a combination thereof.

Further, the information indicating the processing target object included in the object position data 118 is the processing target object ID in the example of FIG. 20(a), but the present invention is not limited thereto. For example, the information may include at least one of image data of a commodity (in an imaging target) presented in the catalog 7, and a storage location and a file name (path) of the image data itself which is separately stored, or may include a combination thereof.

For example, as shown in FIG. 20(b), the object position data 118 may be stored as information indicating a relative position between a detection target object and a processing target object based on information indicating the position of an image region of the detection target object and information indicating the position of an image region in image data of the processing target object.

Alternatively, as shown in FIG. 20(c), information indicating association between a detection target object ID and a processing target object ID, except for position information of objects, may be stored in the database 50 as object association data 122. Further, the processing target object information 110 shown in FIG. 19(a), the detection target object information 112 shown in FIG. 19(b), and the object association data 122 may be combined to form the object position data 118.

Further, as shown in FIG. 20(d), as the object association data 122, information indicating association between a detection target object ID and a process ID may be stored in the database 50. Further, the processing target object information 110 shown in FIG. 19(a), the processing information 114 shown in FIG. 19(c), and the object association data 122 (FIG. 20(d)) may be combined to form the object position data 118.

As described above, the object position data 118 indicates the relative position (which may be the arrangement and range) between the detection target object in the imaging target or the captured image and the processing target object, but information about the relative position between the feature points included in the image region of the detection target object in the imaging target, corresponding to the processing target object, may be further stored in the object position data 118 (FIG. 20(a)). The plural feature points included in the image region of the detection target object may represent a mutual relative position with reference to a predetermined location such as the center or the like of the image region of the detection target object. Further, a display position of a process allocated to the processing target object, for example, a marker display process (in this example, the position of a frame that surrounds a commodity image which is the processing target object) may be stored as a relative position with respect to the detection target object (or plural feature points included in the image region) in the object position data 118 (FIG. 20(b)).

Hereinafter, a case where a process allocated to a processing target object is a process of displaying a marker in a commodity image which is a processing target object disclosed in a catalog will be described as an example, but as described above, the present invention is not limited thereto.

When one or plural markers (or display positions thereof) are associated with the detection target object (or plural feature points included in the image region thereof), a relative position between any one of position information indicating the positions of the described above detection target objects and a display position of a corresponding marker may be included in the object position data 118.

The detection target object or the marker display position (position where the process is executed) may be stored as an arrangement in a predetermined imaging range when an imaging range thereof in addition to the mutual relative position can be specified in advance.

Here, the marker refers to a mark, a frame, a speech balloon, an icon, image processing, or the like for notifying a user that the smart phone 10 recognizes a commodity image on the catalog 7. The display position with respect to the processing target object may be appropriately designated according to the type or shape of the marker, for example. Further, the size, an attribute or the like of the marker together with the display position may be included in the object position data. For example, when the marker is a rectangular frame that surrounds the processing target object, the position of an upper left corner of in the frame and longitudinal and lateral sizes thereof, or the position of the center of the frame, a slope of a diagonal thereof and a distance of the diagonal from the center, or the like may be set as information about the marker display position.

As shown in FIG. 6, when the processing target object is a commodity image of the catalog 7 or the like, information about a commodity associated with the commodity image (processing target object) may be stored in the database 50 as a commodity table 120. The commodity table 120 may include a commodity ID which is commodity identification information, a commodity name, an image ID indicating image information about the commodity (processing target object), a marker ID for identifying a marker displayed on an imaging screen in association with the processing target object (or a process ID for categorizing a process associated with the processing target object), a commodity price, a selling price including taxes, commodity discount information, coupon information relating to the commodity, and the like. The marker ID is not only set for each commodity, but may also be set for each catalog 7, each page, each series of commodities, or the like. Further, it is not essential that the image ID is set for each commodity, and the same image ID (processing target object) may be allocated to the same series of commodities having different commodities, or to different commodities included in the same page or in a predetermined region. That is, the image recognition apparatus 100 of this exemplary embodiment may include a table (not shown) in which plural commodities (processing target objects) corresponding to an image ID and a marker ID (process) allocated to each commodity (processing target object) are associated with each other.

In this exemplary embodiment, the database 50 may further retain marker information associated with a marker ID. In this exemplary embodiment, since the process associated with the processing target object corresponds to the marker display, the marker information is stored, but when a different process is associated, a variety of information relating to the associated process may be stored.

As the marker information, information relating to an attribute of a marker such as a type (mark, text, frame, speech balloon, icon, popup window, operating menu, exchange image, image processing, or the like), a display format (blinking, 3D, zoom, color exchange, animation, or the like), shape, size, color or pattern of the marker may be stored in the database 50 in association with the marker ID or the image ID. Alternatively, an object other than the specified processing target object may be masked so that only the specified processing target object is in close-up, and thus, a user may gaze at only the specified processing target object. Further, as additional information of the process associated with the processing target object, information about content, an operation, or the like displayed in a speech balloon and an operating menu which are markers may be stored in the database 50 in association with the processing target object (commodity ID, image ID, or the like) or the process (marker ID or the like).

Returning to FIG. 3, in the image recognition apparatus 100 of this exemplary embodiment, the object specifying unit 102 extracts at least one region having a feature value for obtaining specific recognition accuracy in a captured image, from imaged data obtained by imaging at least a part of an image by the imaging unit 30 (FIG. 4), by pattern recognition or the like. Further, the object specifying unit 102 searches the database 50, and specifies a detection target object having a feature value of which at least a part matches the feature value of the extracted region in a specific accuracy range. Here, the object specifying unit 102 may extract plural feature points included in the extracted region, and may specify a detection target object based on parameter information including position information about the extracted feature points. It is preferable that for recognition accuracy, an optimal value according to accuracy of an image recognition process or a target to be imaged is appropriately used.

In this exemplary embodiment, it is preferable that the object specifying unit 102 can simultaneously identify plural detection target objects from the image data.

A region having a feature value which is equal to or greater than a predetermined threshold value, obtained by image recognition from an imaging target (captured image), includes an image region of at least one of a processing target object, a detection target object, and the other region.

The object specifying unit 102 may collate feature information about the region obtained by image recognition with feature information about the detection target object in the database 50, to thereby recognize the detection target object.

The object specifying unit 102 may be realized by the smart phone 10 or the server apparatus 60. In this exemplary embodiment, a configuration in which the object position data, the commodity table 120 (information about the processing target object), the information about the marker (processing content), and the like are stored in the database 50 may be used, but the present invention is not limited thereto. For example, at least a part of the information may be stored in the ROM 14 of the smart phone 10 or a recording medium which is attached to the smart phone 10 and is readable by the smart phone 10 (hereinafter, both the ROM 14 and the recording medium may be briefly referred to as a "memory of the smart phone 10").

Further, in the mail-order sale system 1, a configuration in which update information about the above-mentioned information is transmitted to the smart phone 10 from the server apparatus 60 so that updating can be performed using the smart phone 10 may be used. Alternatively, in the mail-order sale system 1, a configuration in which a user designates necessary information, for example, a catalog number, a commodity field, a commodity type, or the like using the smart phone 10 and the designated catalog information is selectively downloaded to the smart phone 10 from the server apparatus 60 for storage may be used.

Further, the processing unit 104 specifies a processing target object which is present at a position associated with the position of a recognized detection target object with reference to the object position data, and obtains a display position of a marker corresponding to the specified processing target object. In this exemplary embodiment, the object specifying unit 102 specifies the detection target object from the captured image, and the processing unit 104 specifies the processing target object associated with the detection target object, but it is not essential that the object specifying unit 102 or the processing unit 104 specifies the "processing target object". It is sufficient if the processing unit 104 can specify the process allocated to the processing target object associated with the detection target object based on the object position data.

In this exemplary embodiment, the process allocated to the processing target object corresponds to marker display with respect to the processing target object, and the processing unit 104 displays a marker corresponding to the processing target object at the obtained display position.

In this exemplary embodiment, it is preferable that the processing unit 104 specifies plural processing target objects from a captured image so that plural markers corresponding to the plural processing target objects can be simultaneously displayed on a screen of the smart phone 10.

Here, an example in which a region including the vicinity of a processing target object is set as a detection target object and the detection target object is stored in object position data in association with the processing target object will be described. This configuration example is particularly effective when a feature information quantity of a processing target object is small and image recognition accuracy is low or when the size of a processing target object is small and recognition is difficult.

In this exemplary embodiment, feature information (a feature value or the like of an image region) in a region including the vicinity of a processing target object in an imaging target is stored in the database 50 as information about a detection target object.

The processing unit 104 of the image recognition apparatus 100 searches the database 50 based on a region having a predetermined feature value extracted from an imaging target by image recognition. Further, when there is a detection target object, in a captured image, having a feature value which at least partially matches a feature value included in a region including the vicinity of a processing target object, stored as a detection target object in the database 50, the processing unit 104 specifies a processing target object which is present at a relative position from the position of the image region having the feature value of the detection target object in the captured image, based on the object position data. Further, the processing unit 104 may obtain a display position of a marker for performing a process allocated to the specified processing target object, for example, a marker display process. Furthermore, the processing unit 104 displays a marker corresponding to the processing target object at the obtained display position.

Figure 7:
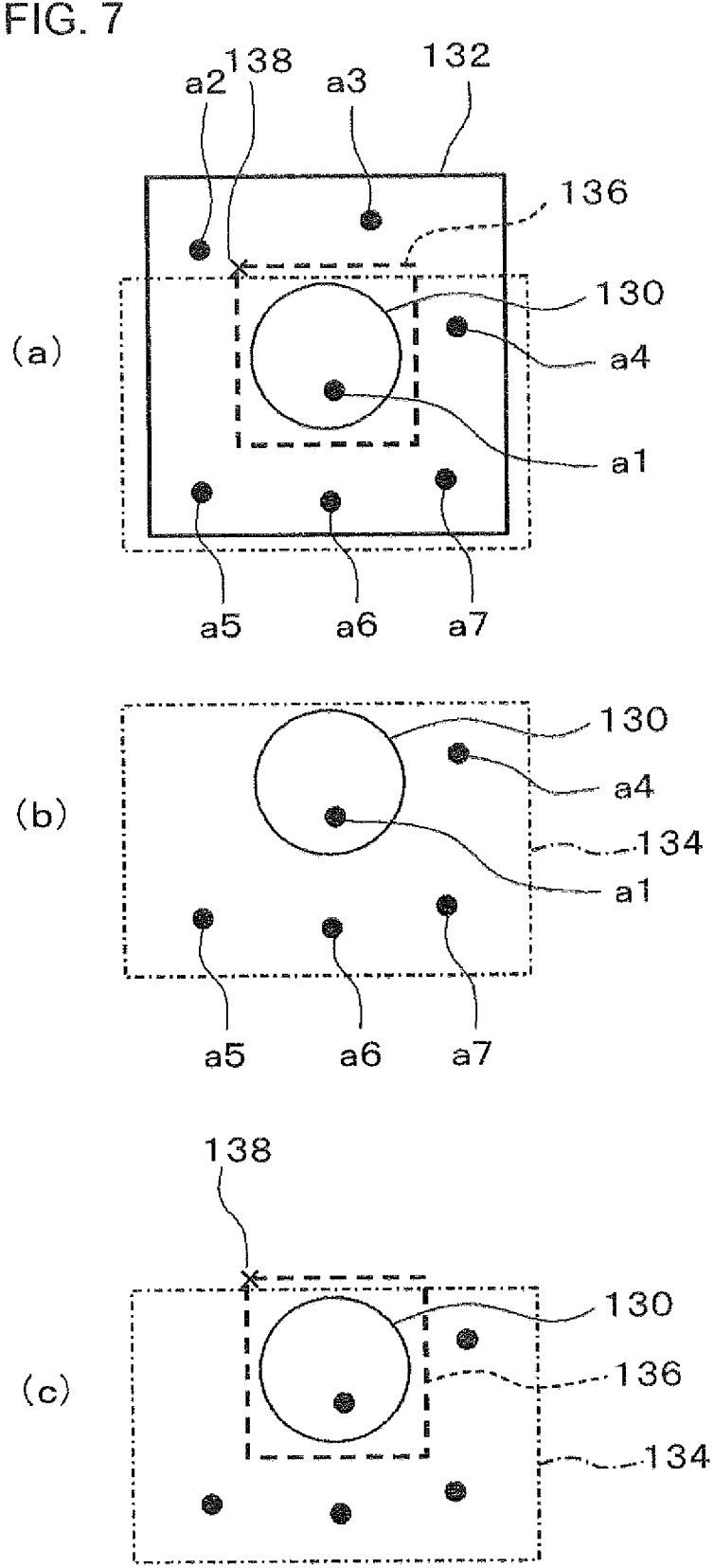
FIG. 7 are diagrams illustrating a relationship between a processing target object, a detection target object, and a marker in an image recognition apparatus according to an exemplary embodiment of the present invention.

FIG. 7 are diagrams illustrating a relationship between a processing target object, a detection target object (a feature point thereof), and a marker in the image recognition apparatus 100 according to the exemplary embodiment of the present invention. In the following description, in the drawings, a feature point is indicated as a "point (circle)" for simplicity of description, but the shape of the feature point is not particularly limited.

For example, a case where a feature value of a processing target object is small will be described. As shown in FIG. 7(a), in the processing target object 130, when a feature point having a predetermined feature value is only a1, it is considered that recognition accuracy of the processing target object 130 is lowered. Further, when the size of the processing target object 130 is small, similarly, it is considered that recognition is not easy due to a small feature value, or absence of a feature point, or the like. Thus, in this exemplary embodiment, a region range of the detection target object associated with the processing target object 130 is enlarged up to a region 132 including the vicinity of the processing target object 130. It is preferable that the region 132 which is the detection target object is determined to have a feature value having recognition accuracy of a predetermined level or higher.

That is, as shown in FIG. 7(a), plural feature points a1 to a7 are set as a detection target object with respect to the processing target object 130, and information about the feature points is stored in object position data. Respective feature values of the feature points a1 to a7 and relative positions between the feature points are stored in the object position data in association with the processing target object 130 (a relative position thereof) as the detection target object. Further, in this exemplary embodiment, a display position of a marker 136 is also stored in the object position data in association with the processing target object 130.

In this exemplary embodiment, in the database 50, the feature points included in the region including the vicinity of the processing target object, their relative positions (information about the detection target object in an imaging target (captured image)), and a display position of a marker corresponding to the processing target object are stored in the object position data in advance.

Here, when plural processing target objects are adjacently present, the same detection target object may be associated with different processing target objects in an overlapping manner. In such a case, plural processing target objects associated with the detection target object detected from a captured image may be specified by the processing unit 104.

Further, the object specifying unit 102 extracts feature points in at least a part of the region 132 including the vicinity of the processing target object 130, and their relative positions. For example, as shown in FIG. 7(*b*), if at least a part of an imaging target including the processing target object 130 is imaged by putting the smart phone 10 closer thereto, for example, feature points a1, a4, a5, a6, and a7 included in an imaging range 134 of a captured image are extracted, and their relative positions are calculated. Here, a feature value of at least the part of the region 132 corresponding to the detection target object, which is imaged, is also extracted.

In the image recognition apparatus 100, the object specifying unit 102 collates the feature points a1, a4, a5, a6, and a7 extracted by image recognition and their relative positions with feature information about a detection target object in the database 50 (object position data), and when the feature points and the relative positions at least partially match with the feature information, the object specifying unit 102 recognizes the position of the detection target object in the captured image. Then, the processing unit 104 specifies the processing target object 130 which is present at a relative position from the recognized position of the detection target object based on the object position data. Furthermore, the processing unit 104 obtains a display position of a marker 136 which is information for performing marker display which is a process allocated to the specified processing target object 130.

In this way, since the feature points a1, a4, a5, a6, and a7 which correspond to at least a part of the plural feature points a1 to a7 included in the region 132 including the vicinity of the processing target object 130 are detected based on the feature points a1, a4, a5, a6, and a7, and their relative positions, the object specifying unit 102 can recognize that at least a part of the region 132 (detection target object) is imaged, and the processing unit 104 can specify the processing target object 130 corresponding to the recognized region 132 (detection target object). Further, the processing unit 104 obtains a display position 138 of the marker 136 to perform a process allocated to the specified processing target object 130 based on the detected relative positions of the feature points a1, a4, a5, a6, and a7 (information about the detection target object in the imaging target (captured image)), that is, a marker display process in this example.

The processing unit 104 displays the marker 136 corresponding to the processing target object 130 in the imaging range 134 with reference to the obtained display position 138, as shown in FIG. 7(*c*).

Further, the image recognition apparatus 100 of this exemplary embodiment may have a configuration in which the components are separately provided in the smart phone 10 and the server apparatus 60 by an arbitrary combination.

Specifically, the image recognition apparatus 100 realizes the functions as follows:
(a) A function of extracting a region having a feature value for obtaining specific recognition accuracy from a captured image by image recognition;
(b) a function of collating feature information about the region extracted from the captured image with feature information about a detection target object in the database 50 to recognize that, when there is a detection target object for which the feature information matched by a predetermined threshold value or greater, the detection target object is included in the captured image;
(c) a function of specifying a processing target object which is present at a relative position from the position of the detection target object recognized to be included in the captured image, based on object position data;
(d) a function of obtaining a display position of a marker for a marker display process as a process allocated to the specified processing target object; and
(e) a function of displaying a marker corresponding to the processing target object at the obtained display position.

Instead of (c) and (d), a function of specifying the process allocated to the processing target object from the position of the detection target object recognized in (b) may be used. That is, only the process may be performed without specifying the processing target object.

In this case, for example, ten function-sharing combination methods may be considered as follows.
(1) All the functions are realized by the smart phone 10.
(2) The function (a) is realized by the smart phone 10, its result is transmitted to the server apparatus 60, and the functions (b) to (e) are realized by the server apparatus 60.
(3) The functions (a) and (b) are realized by the smart phone 10, their results are transmitted to the server apparatus 60, and the functions (c) to (e) are realized by the server apparatus 60.
(4) The functions (a) to (c) are realized by the smart phone 10, their results are transmitted to the server apparatus 60, and the functions (d) and to (e) are realized by the server apparatus 60.
(5) The functions (a) to (d) are realized by the smart phone 10, their results are transmitted to the server apparatus 60, and the function (e) is realized by the server apparatus 60.
(6) All the functions are realized by the server apparatus 60.
(7) The function (a) is realized by the server apparatus 60, and the functions (b) to
(e) are realized by the smart phone 10, by receiving an extracted region from the server apparatus 60.
(8) At least the function (b) is realized by the server apparatus 60, and the functions (c) and (e) are realized by the smart phone 10 by receiving a specified detection target object from the server apparatus 60.
(9) At least the functions (b) and (c) are realized by the server apparatus 60, and the functions (d) and (e) are realized by the smart phone 10 by receiving a specified processing target object from the server apparatus 60.
(10) At least the function (d) is realized by the server apparatus 60, and the function (e) is realized by the smart phone 10, by receiving a marker display position from the server apparatus 60.

Further, for example, in the case of a pattern in which video image data captured on the side of the server apparatus 60 is streaming-delivered to the smart phone 10 for display, a configuration in which the smart phone 10 and the server apparatus 60 in the above-described specific example are exchanged may be considered.

Further, a technique called augmented reality (AR) capable of additionally presenting information using a computer to a real environment imaged using a camera or the like may be applied to the image recognition apparatus 100, for example. Using the AR technique, it is possible to recognize a three-dimensional coordinate system in which a region where a processing target object is specified on a video image captured by a camera of the smart phone 10 or the like is set as an XY plane, and to display a corresponding marker on the display unit 26 as a 3D object, for example.

In the image recognition apparatus 100 of this exemplary embodiment, a marker corresponding to a processing target object may have a user interface function for receiving a user's operation with respect to the processing target object.

The image recognition apparatus 100 may further include a reception unit that receives a user's operation using the user interface function of the marker corresponding to the processing target object displayed by the processing unit 104.

In the image recognition apparatus 100, the reception unit, according to an operation received, may output as an instruction to execute a predetermined process, for example, a commodity purchasing process or the like which is selected by the operation.

In the image recognition apparatus 100 of this exemplary embodiment, as the CPU of the smart phone 10 or the server apparatus 60 executes various processing operations corresponding to a computer program, the above-described various units are realized as various functions.

A computer programs of this exemplary embodiment is configured to cause a computer for realizing the image recognition apparatus 100 to execute a procedure for specifying a position, in a captured image, of a detection target object which is set in a predetermined arrangement according to a processing target object in an imaging target and has a feature depending on the processing target object, by image recognition, and a procedure for specifying, based on object position data indicating a relative position between the detection target object in the imaging target and the processing target object which is set in a predetermined arrangement according to the imaging target and has a feature depending on the imaging target, the processing target object in the captured image which is present at the relative position from the position of the specified detection target object in the captured image, and executing a process allocated to the specified processing target object.

In the computer program, the procedure for executing the process includes specifying the processing target object in the captured image, which is at the relative position from the position of the specified detection target object in the captured image, and executing the process allocated to the specified processing target object. However, it is not essential to specify the position of the processing target object, and it is sufficient if at least the processing target object can be specified.

Accordingly, instead of the procedure for executing the above process, for example, the computer program of the present invention may be configured to cause a computer to execute a procedure for specifying, based on object position data in which position information of a detection target object in an imaging target and a processing target object which is set in a predetermined arrangement according to the imaging target and has a feature depending on the imaging target are associated with each other, the associated processing target object in the captured image from the position of the specified detection target object in the captured image, and executing a process allocated to the specified processing target object.

The computer program of this exemplary embodiment may be recorded in a computer-readable recording medium. The recording medium is not particularly limited, but may employ various types of recording mediums. Further, the program may be loaded to a memory of a computer from the recording medium, or may be downloaded to the computer through a network to be loaded to the memory.

Figure 8:
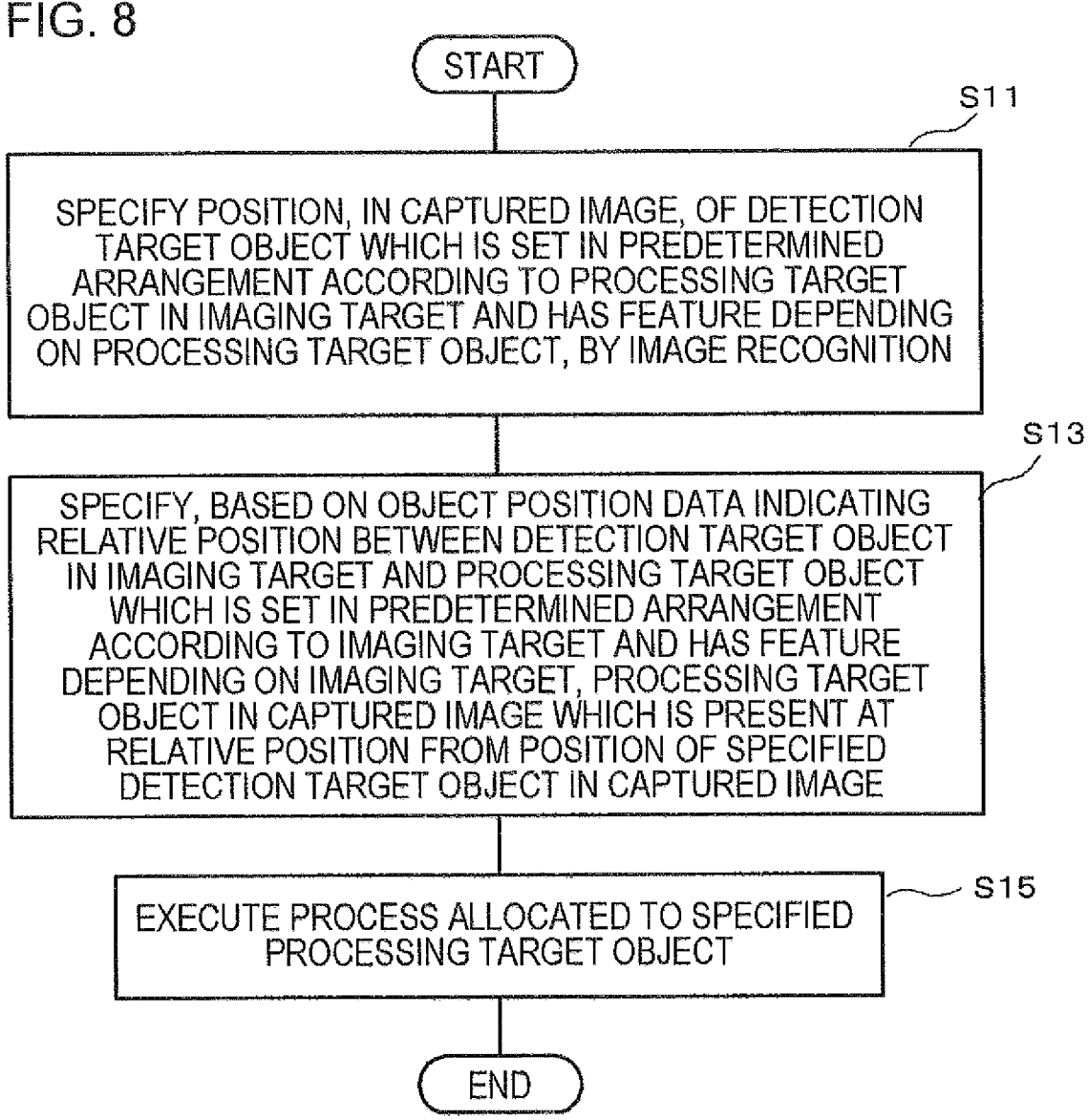
FIG. 8 is a flowchart illustrating an example of an operation of an image recognition apparatus according to an exemplary embodiment of the present invention.

In such a configuration, a processing method of the image recognition apparatus 100 of this exemplary embodiment will be described. FIG. 8 is a flowchart illustrating an example of an operation of the image recognition apparatus 100 of this exemplary embodiment.

In the processing method of the image recognition apparatus 100 according to this exemplary embodiment of the present invention, the image recognition apparatus 100 specifies a position, in a captured image, of a detection target object which is set in a predetermined arrangement according to a processing target object in an imaging target and has a feature depending on the processing target object, by image recognition (step S11), specifies, based on object position data indicating a relative position between the detection target object in the imaging target and the processing target object which is set in a predetermined arrangement according to the imaging target and has a feature depending on the imaging target, the processing target object in the captured image which is present at the relative position from the position of the specified detection target object in the captured image (step S13), and executing a process allocated to the specified processing target object (step S15).

Figure 9:
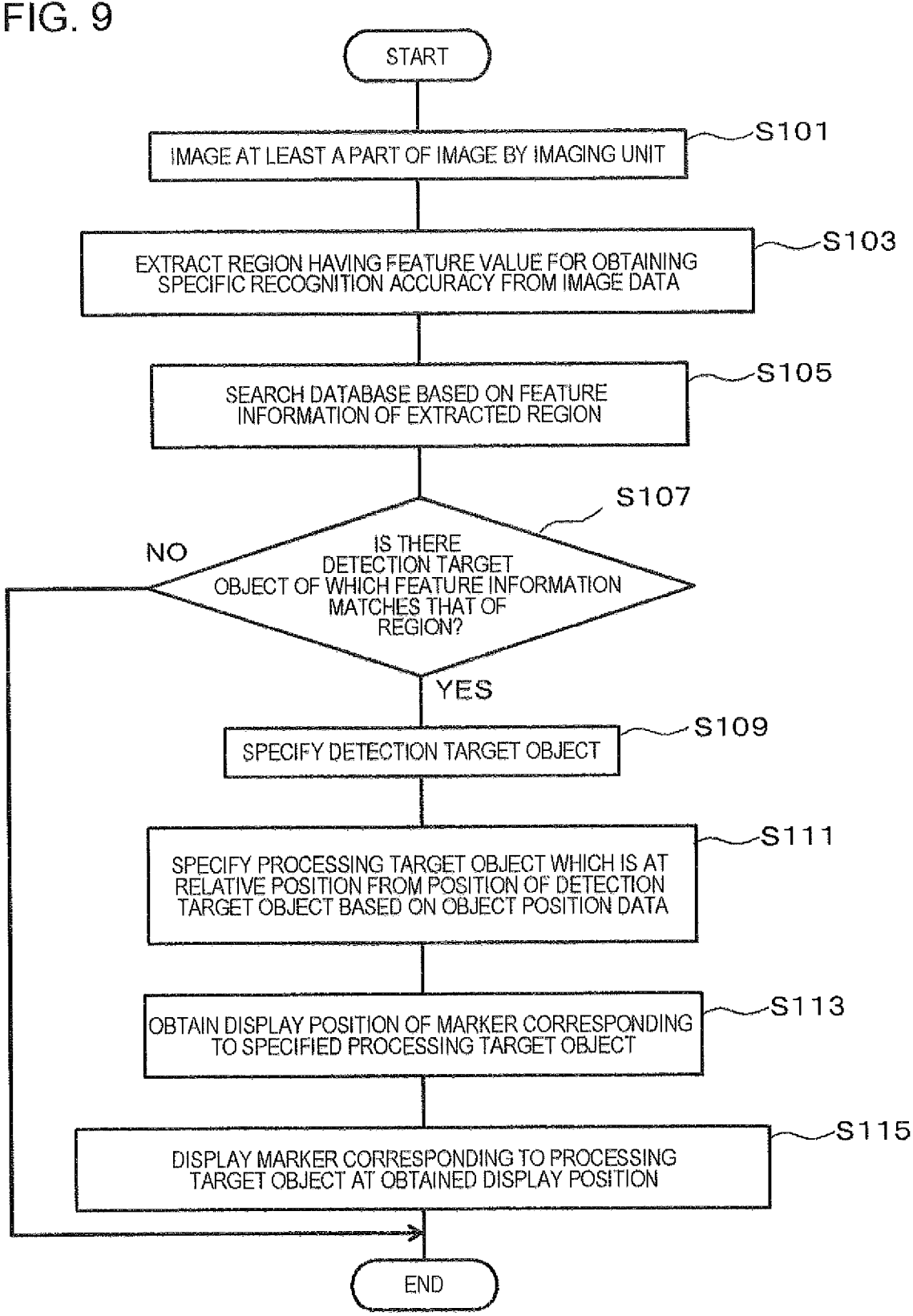
FIG. 9 is a flowchart illustrating a specific example of an operation of an image recognition apparatus according to an exemplary embodiment of the present invention.

More specifically, as shown in FIG. 9, in the image recognition apparatus 100, the object specifying unit 102 extracts, by image recognition (step S103), a region having a feature value for obtaining specific recognition accuracy from image data obtained by imaging at least a part of an image by the imaging unit 30 (FIG. 4) (step S101). Further, the object specifying unit 102 searches the database 50 based on feature information of the region extracted from the image data by image recognition (step S105). Then, when the object specifying unit 102 finds a detection target object of which feature information matches the feature information of the extracted region by a predetermined threshold value or higher, in the database 50 (YES in step S107), the object specifying unit 102 specifies the detection target object (step S109). Further, the processing unit 104 specifies a processing target object which is present at a relative position from the position of the detection target object, based on the object position data (step S111). Then, the processing unit 104 obtains a display position of a marker for performing a marker display process allocated to the specified processing target object (step S113), and displays a marker corresponding to the processing target object at the obtained display position (step S115).

As described above, according to the image recognition apparatus 100 of this exemplary embodiment of the present invention, even when a feature value of a processing target object is small or the size thereof is small, it is possible to prevent lowering of recognition accuracy. This is because a region including the vicinity of the processing target object is stored as a detection target object in association with the processing target object, and the detection target object is detected instead of detecting the processing target object, so that the processing target object can be specified. In other words, even in the case of an image for which an desired result cannot be obtained in an image recognition process of the processing target object itself, according to the image recognition apparatus 100 of this exemplary embodiment, since the processing target object is specified after the detection target object set in association with the processing target object is specified by image recognition, it is possible to correctly specify the processing target object, and to appropriately perform a process allocated to the processing target object, for example, to display a marker at an appropriate position.

Further, in this exemplary embodiment of the present invention, by using a configuration in which information relating to the entirety of an image of a processing target object is not stored in the database 50 and at least a part of region of an imaging target is stored in the database 50 as a detection target object associated with the processing target object, it is possible to greatly reduce necessary storage capacity for retaining. Further, since the image recognition apparatus 100 of this exemplary embodiment of the present invention performs only a collation process with respect to the detection target object corresponding to the partial region compared with a case where a collation process with respect to an image in the database 50 is performed using the information relating to the entirety of the image of the processing target object, recognition accuracy is remarkably enhanced.

(Second Exemplary Embodiment)

An image recognition apparatus according to an exemplary embodiment of the present invention is different from the image recognition apparatus 100 of the above-described exemplary embodiment in that a region which is easily recognized in an imaging target is used as a detection target object. Since the image recognition apparatus of this exemplary embodiment has the same configuration as in the image recognition apparatus 100 of the above-described exemplary embodiment in FIG. 3, hereinafter, description thereof will be made with reference to FIG. 3. This exemplary embodiment is different from the above-described exemplary embodiment in a detection target object stored in the database 50.

Figure 10:
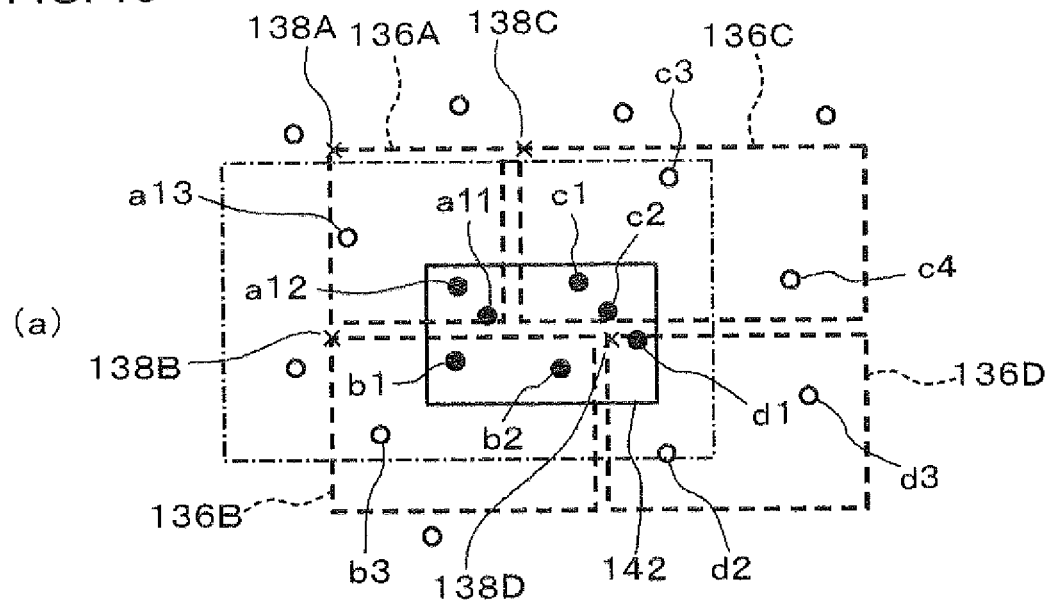
FIG. 10 are diagrams illustrating a relationship between a processing target object, a detection target object, and a marker in an image recognition apparatus according to an exemplary embodiment of the present invention.
Figure 10:
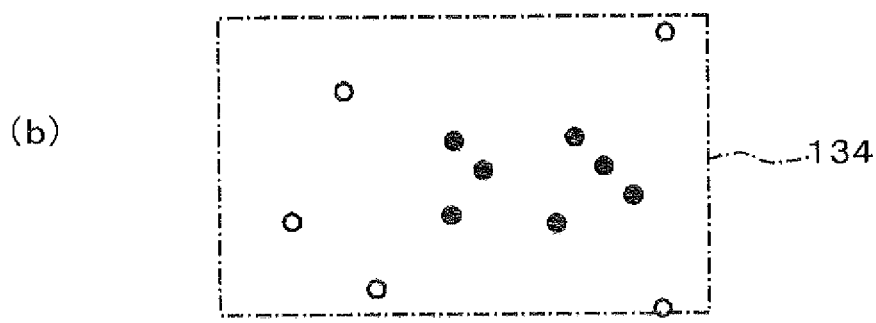
Figure 10:
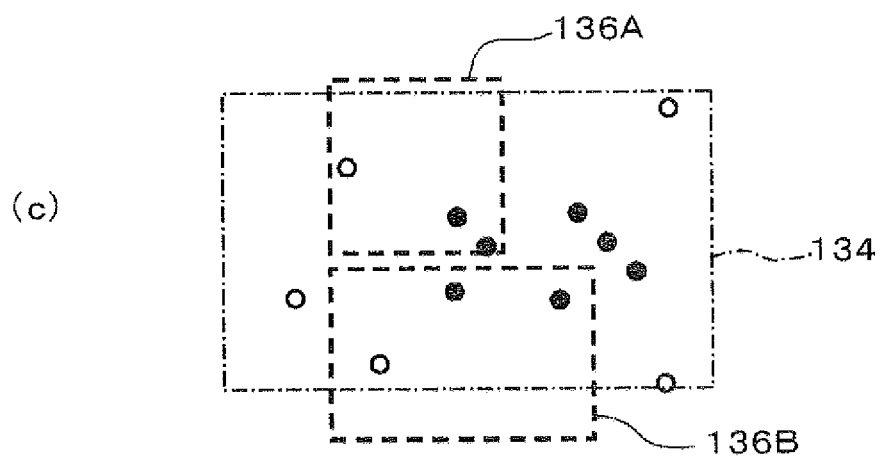

FIG. 10 are diagrams illustrating a relationship between a processing target object, a detection target object, and a marker (processing position thereof) in the image recognition apparatus 100 according to the exemplary embodiment of the present invention.

As the processing target object, for example, it is assumed that four images are adjacent to each other. Plural feature points are present in each image. For example, as shown in FIG. 10(*a*), feature points corresponding to a processing target object represented by a marker 136A are a11 to a13. Feature points corresponding to a processing target object represented by a marker 136B are b1 to b3. Feature points corresponding to a processing target object represented by a marker 136C are c1 to c4. Feature points corresponding to a processing target object represented by a marker 136D are d1 to d3.

Information about these feature points may be stored in the database 50 in association with plural processing target objects as a detection target object for each of plural images, but in this exemplary embodiment, common feature points of four processing target objects, for example, feature information of a region 142 where the feature points are densely disposed, is stored in the database 50 in association with the plural processing target objects as a detection target object.

In this exemplary embodiment, for example, feature values of feature points a11, a12, b1, b2, c1, c2, and d1 included in the region 142 and relative positions thereof are stored in the database 50 in association with plural processing target objects, respectively, as a detection target object. Further, relative positions of display positions 138A to 138D of markers for performing marker display processes allocated to the respective processing target objects are stored in the database 50 in association with the processing target objects.

Here, the region 142 is a region including feature points of which a feature value is a threshold value or greater or a likelihood is a threshold value or higher.

In this exemplary embodiment, a detection target object includes a preset region (position or size thereof) which is easily detected in an imaging target, according to a processing target object.

In the image recognition apparatus 100 of this exemplary embodiment, the object specifying unit 102 extracts at least a part of feature information in the recognition region 142 by image recognition. Further, the object specifying unit 102 searches the database 50 based on the feature information extracted by image recognition. Further, when the object specifying unit 102 finds a detection target object having feature information which matches feature information in a captured image by a threshold level or higher, in the database 50, the object specifying unit 102 specifies the detection target object. Further, the processing unit 104 specifies a processing target object which is present at a relative position from the position of the detection target object, based on object position data. Further, the processing unit 104 obtains a display position for performing a marker display process allocated to the specified processing target object. Further, the processing unit 104 displays a marker corresponding to the processing target object at the obtained display position.

As shown in FIG. 10(*b*), when the smart phone 10 is put closer to an image for image-capturing, the object specifying unit 102 extracts feature points included in the imaging range 134 and their relative positions, for example. Further, the object specifying unit 102 searches the database 50 to find a detection target object of which feature information matches at least a part of the feature points a11, a12, b1, b2, c1, c2, and d1 extracted from the captured image. Then, the processing unit 104 specifies a processing target object which is present at a relative position from the position of the found detection target object (region 142) based on the object position data. In this exemplary embodiment, four processing target objects are specified, and display positions 138A to 138D of four markers 136A to 136D which are allocated to the four processing target objects are respectively obtained by the processing unit 104.

The image recognition apparatus 100 may display four markers based on the display positions, but as shown in FIG. 10(*c*), may display the markers 136A and 136B only with respect to processing target objects which are present at a central part of the imaging range 134.

Figure 11:
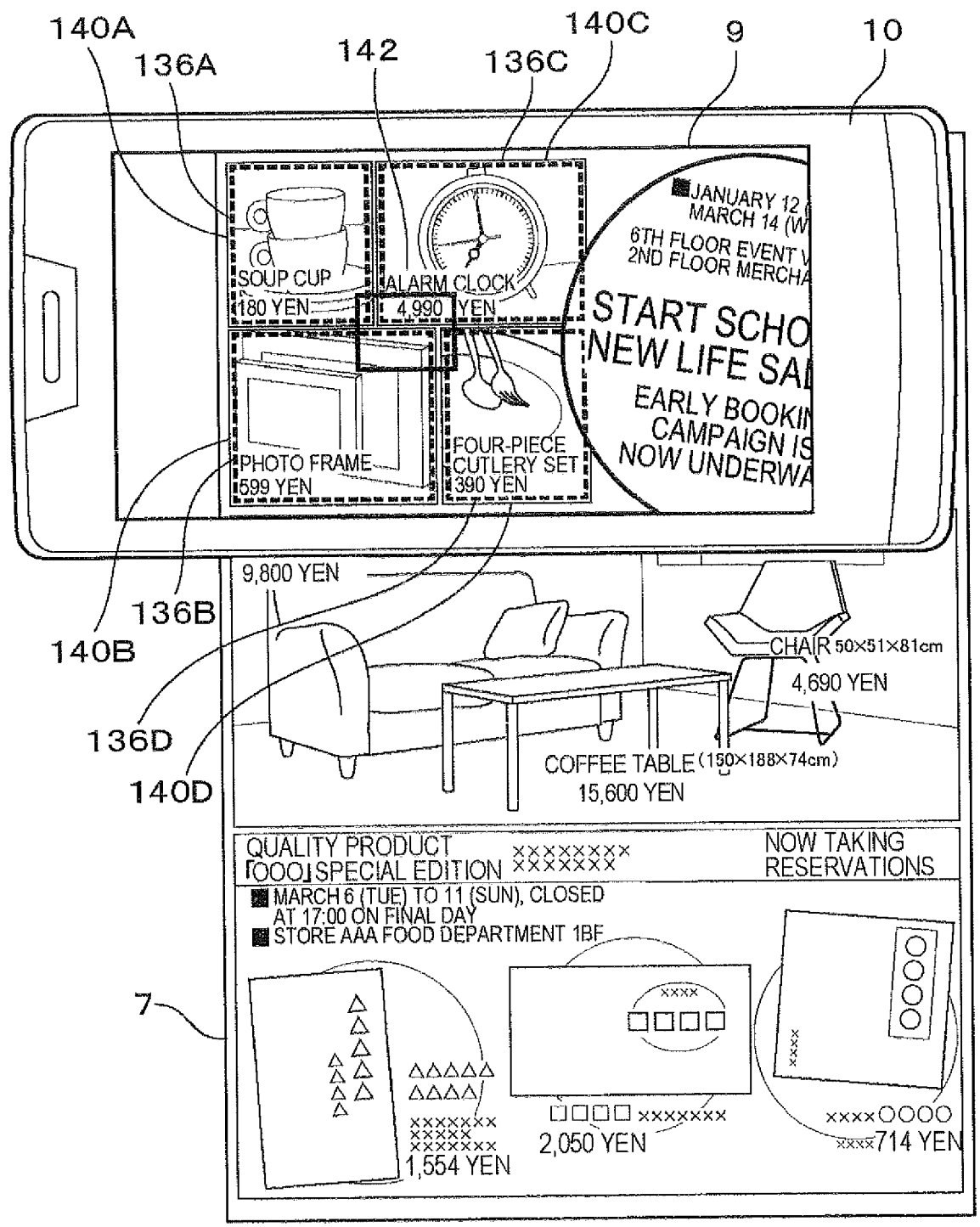
FIG. 11 is a diagram illustrating a display screen when image recognition is performed using an image recognition apparatus according to an exemplary embodiment of the present invention.

For example, as shown in FIG. 11, plural markers 136A to 136D respectively corresponding to plural processing target objects 140A to 140D are displayed on a preview screen 9 of the catalog 7 imaged by putting the smart phone 10 over the catalog 7. Here, inside the smart phone 10, at least a part of a region 142 is extracted from image data, so that a corresponding detection target object is specified. Further, four processing target objects 140A to 140D associated with the detection target object are specified. Furthermore, relative positions of display positions of markers with respect to the position of the detection target object are obtained, and plural markers 136A to 136D respectively corresponding to the processing target objects 140A to 140D are displayed.

In this way, as feature information about a portion which is easily recognized in an image is associated with plural processing target objects as a detection target object, even when a feature value of each processing target object is small, the image recognition apparatus of the present invention can prevent lowering of recognition accuracy.

In FIG. 10, the recognition region 142 includes all processing target objects, but the present invention is not limited thereto. The recognition region 142 may be a region in an image other than the processing target objects. Alternatively, the recognition region 142 may be a region including at least a part of the processing target objects.

Figure 12:
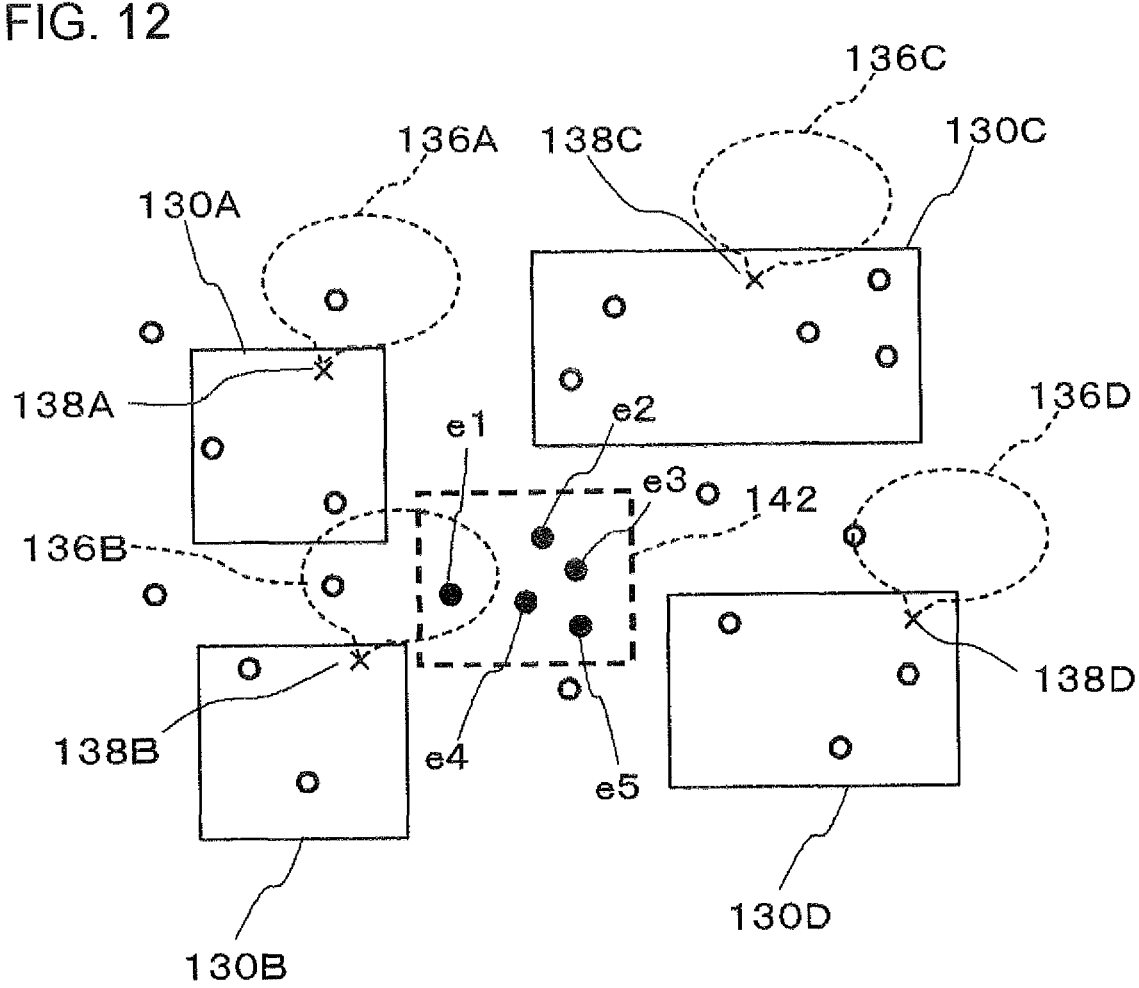
FIG. 12 is a diagram illustrating a relationship between a processing target object, a detection target object, and a marker in an image recognition apparatus according to an exemplary embodiment of the present invention.

For example, as shown in FIG. 12, feature points e1 to e5 included in a recognition region 142 other than image regions of processing target objects 130A to 130D, and their relative positions may be stored in the database 50 as a detection target object. Further, display positions 138A to 138D of markers 136A to 136D of the processing target objects 130A to 130D may be stored in the database 50 in association with the relative positions of the feature points e1 to e5.

As described above, according to the image recognition apparatus 100 of this exemplary embodiment of the present invention, the same effects as in the above exemplary embodiment are achieved. This is because an image region having a feature value which is easily recognized in an image including plural processing target objects can be stored as a detection target object associated with the processing target objects and can be used for specification of the processing target objects.

Since feature information in a common region can be used as a detection target object corresponding to plural processing target objects, it is possible to further reduce a necessary storage capacity, compared with a case where feature information of an image is stored in the database 50 for each processing target object.

(Third Exemplary Embodiment)

An image recognition apparatus according to an exemplary embodiment of the present invention is different from the image recognition apparatus 100 of the above-described exemplary embodiment in that a region including plural processing target objects which are adjacent to each other in an image is used as a detection target object. Since the image recognition apparatus of this exemplary embodiment has the same configuration as in the image recognition apparatus 100 of the above-described exemplary embodiment shown in FIG. 3, hereinafter, description thereof will be made with reference to FIG. 3. This exemplary embodiment is different from the above-described exemplary embodiment in a detection target object stored in the database 50.

In the image recognition apparatus according to this exemplary embodiment of the present invention, a detection target object includes at least a part of a region including the vicinity of a processing target object.

Further, in the image recognition apparatus of this exemplary embodiment of the present invention, the detection target object is associated with plural processing target objects (relative positions thereof).

Figure 13:
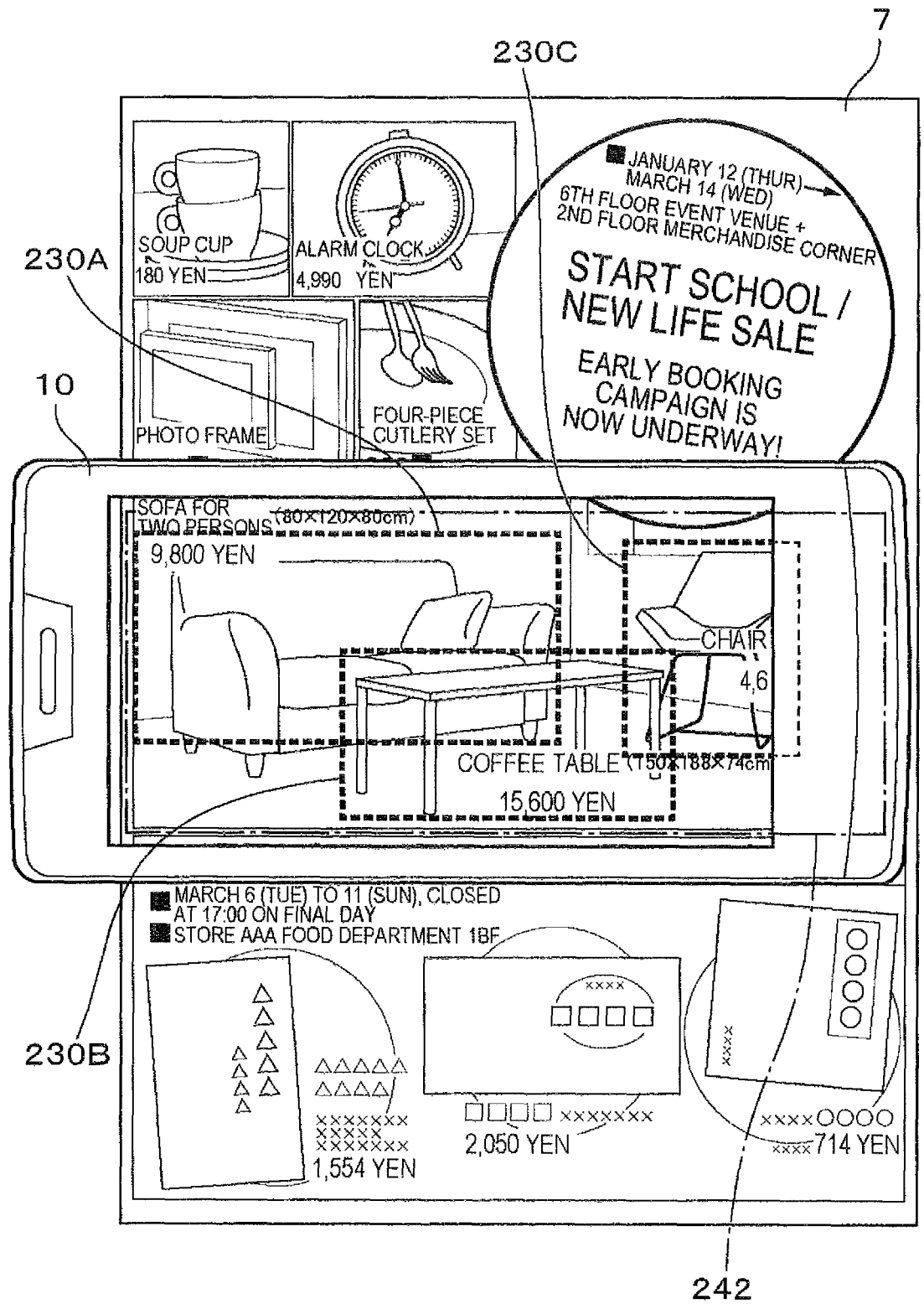
FIG. 13 is a diagram illustrating an image recognition method in an image recognition apparatus according to an exemplary embodiment of the present invention.

FIG. 13 is a diagram illustrating an image recognition method in the image recognition apparatus 100 according to the exemplary embodiment of the present invention.

In the image recognition apparatus 100 of this exemplary embodiment, the object specifying unit 102 searches the database 50 to find a detection target object of which feature information at least partially matches feature information of a region, having a feature value for obtaining specific recognition accuracy, extracted from a captured image by image recognition. Further, the processing unit 104 specifies, based on object position data indicating relative positions between a detection target object (for example, plural feature points and their relative positions) included in an adjacent target region 242 including plural processing target objects (in the figure, three items of a sofa, a coffee table, and a chair) which are adjacent to each other in an imaging target, and the processing target objects, processing target objects that are present at the relative positions from the position of the found detection target object. Furthermore, the processing unit 104 obtains display positions of markers for marker display processes allocated to the specified processing target objects. Then, the processing unit 104 displays markers 230A to 230C corresponding to the processing target objects at the obtained display positions.

Here, it is not essential that the "adjacent" processing target objects in the captured image are in contact with each other. The "adjacent" processing target objects include, for example, an image in which plural processing target objects (items) to be individually recognized are included on the same recognition target screen but are not easily individually recognized on the recognition target screen, for example, an image in which the processing target objects (items), or the processing target objects (items) and a background are mixed and are not easily recognized. Alternatively, the "adjacent" processing target objects also include an imaging target in which one processing target object (item) includes or overlaps at least a part of another processing target object (item).

According to this exemplary embodiment, the same effects as in the above exemplary embodiment are achieved. Further, even when the processing target objects (items) to be individually recognized are mixed on the same recognition target screen and are not easily recognized, it is possible to specify an individual processing target object (item), and to display a corresponding marker.

(Fourth Exemplary Embodiment)

An image recognition apparatus according to an exemplary embodiment of the present invention is different from the image recognition apparatus 100 of the above-described exemplary embodiment in that a detection target object embedded for recognition in an imaging target is used. Since the image recognition apparatus of this exemplary embodiment has the same configuration as in the image recognition apparatus 100 of the above-described exemplary embodiment in FIG. 3, hereinafter, description thereof will be made with reference to FIG. 3. This exemplary embodiment is different from the above-described exemplary embodiment in a detection target object stored in the database 50.

In the image recognition apparatus according to this exemplary embodiment of the present invention, a detection target object at least includes information for detection.

In the image recognition apparatus 100 of this exemplary embodiment, the object specifying unit 102 searches the database 50 to find a processing target object of which feature information extracted by image recognition, at least partially matches a region having a feature value for obtaining specific recognition accuracy. Further, the processing unit 104 specifies a processing target object which is at a relative position from the position of the found detection target object, based on object position data indicating a relative position between: a detection target object for recognition which is embedded in a captured image in advance so that at least a part thereof is included in a captured screen obtained by an imaging unit; and the processing target object. Further, the processing unit 104 obtains a display position of a marker for a marker display process allocated to the specified processing target object. Then, the processing unit 104 displays a marker corresponding to the processing target object at the obtained display position.

In this exemplary embodiment, the detection target object for recognition refers to an image region having a predetermined feature value, intentionally embedded in advance in an imaging target. The detection target object for recognition may be an electronic watermark or a two-dimensional code such as a QR Code®, for example. In this exemplary embodiment, the position of a detection target object or the position of a corresponding processing target object according to an imaging target may be individually set. Further, it is possible to set, as a detection target object, an arbitrary region where a specific condition is satisfied, for example, a region in an imaging target from which sufficient feature information for obtaining specific recognition accuracy, when the imaging target in which a detection target object is embedded is imaged by a user, may be extracted by image recognition.

According to this configuration, the same effects as in the above exemplary embodiment are achieved. Further, even in the case of an imaging target image from which it is difficult to set a detection target object (for example, in the case of a whole monochrome image, or the like), by intentionally embedding a detection target object for recognition, it is possible to specify a processing target object, and to display a marker. Further, when using an electronic watermark, since a detection target object is not shown to a user, the user can easily read an image without disturbance.

(Fifth Exemplary Embodiment)

An image recognition apparatus according to an exemplary embodiment of the present invention is different from the image recognition apparatus 100 of the above-described exemplary embodiment in that plural detection target objects are set in an imaging target to be arranged therein with evenness to a certain extent and all processing target objects included in the imaging target can be specified by relative positions with respect to the detection target objects. Since the image recognition apparatus of this exemplary embodiment has the same configuration as in the image recognition apparatus 100 of the above-described exemplary embodiment in FIG. 3, hereinafter, description thereof will be made with reference to FIG. 3. This exemplary embodiment is different from the above-described exemplary embodiment in a detection target object stored in the database 50.

In the image recognition apparatus 100 according to this exemplary embodiment, a detection target object is disposed in an imaging target so that at least one detection target object is included in a captured image.

Figure 17:
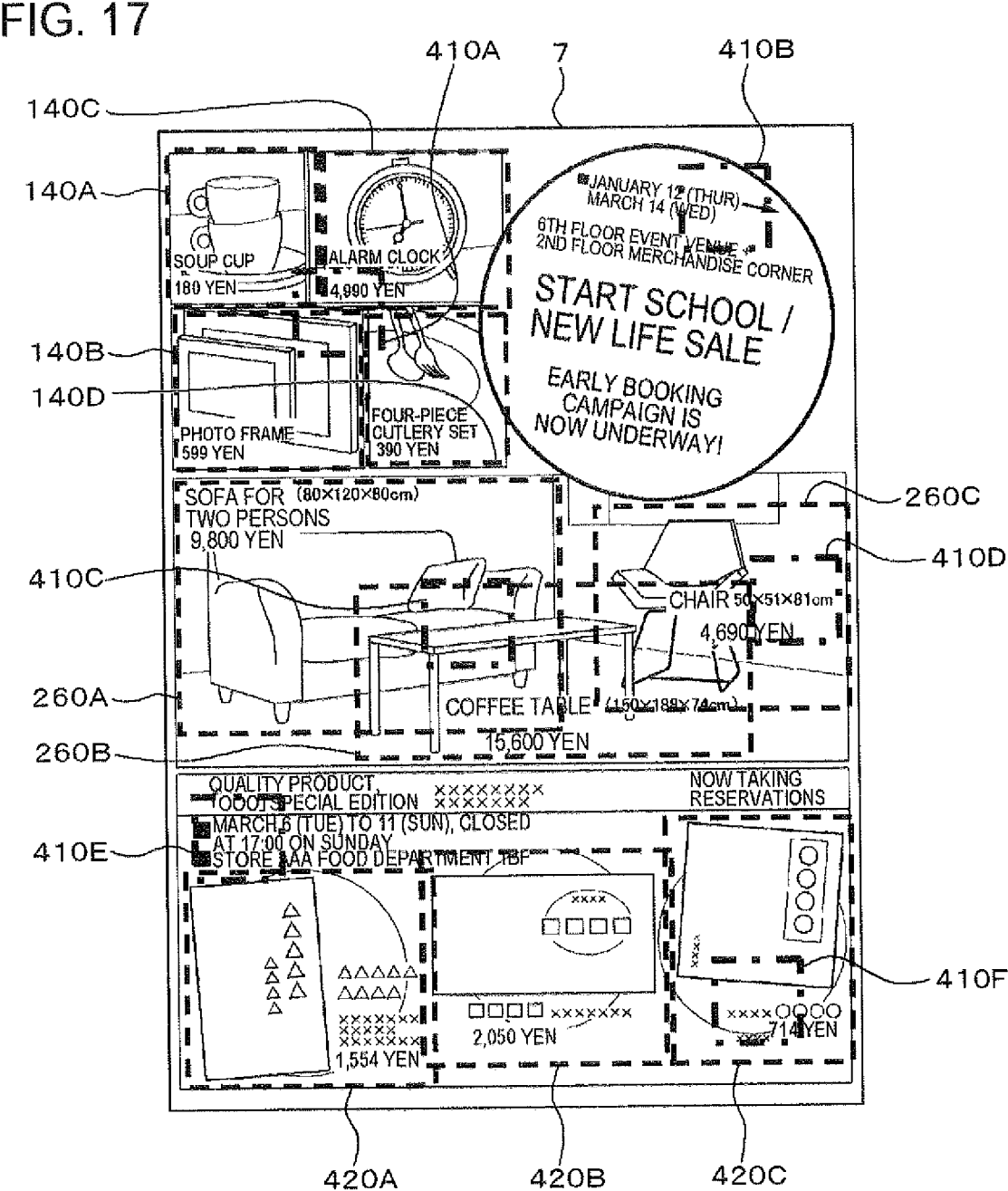
FIG. 17 is a diagram illustrating a state where detection target objects are evenly arranged in an image recognition apparatus according to an exemplary embodiment of the present invention.
Figure 18:
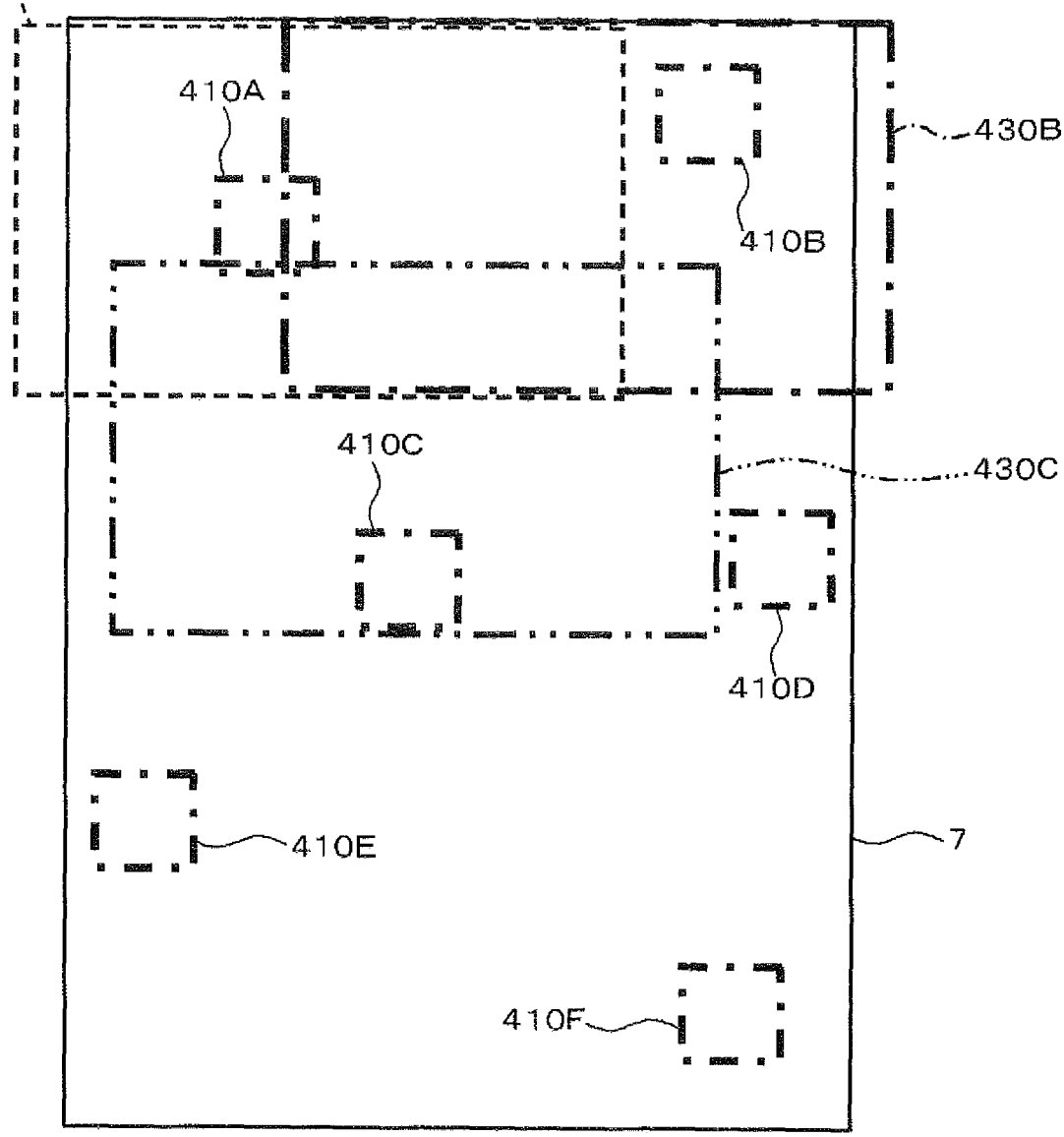
FIG. 18 is a diagram illustrating a state where detection target objects are evenly arranged in an image recognition apparatus according to an exemplary embodiment of the present invention.

FIG. 17 and FIG. 18 are diagrams illustrating states where detection target objects are evenly arranged, in the image recognition apparatus 100 according to the exemplary embodiment of the present invention.

In the image recognition apparatus 100 of this exemplary embodiment, the object specifying unit 102 searches the database 50 in which a region selected so that at least a part of a region having a feature value for obtaining specific recognition accuracy is included in a captured screen obtained by imaging at least a part of an image by the imaging unit is set and stored as a detection target object.

As shown in FIG. 17, when plural processing target objects 140A, 140B, 140C, 140D, 260A, 260B, 260C, 420A, 420B, and 420C are included in an imaging target (catalog 7), plural detection target objects 410A, 410B, 410C, 410D, 410E, and 410F are arranged in the imaging target. In this way, the detection target objects are evenly arranged in the imaging target.

Here, the detection target objects 410A, 410B, 410C, 410D, 410E, and 410F are evenly arranged in the imaging target so that at least a part of regions thereof are included in an imaging screen in consideration of an expected size of the imaging screen. The detection target object 410A is included in an imaging range 430A indicated by a dashed line in FIG. 18. Further, when the imaging range is moved to an imaging range 430B, the detection target object 410B is included in the imaging range 430B. Further, when the imaging range is moved downward to an imaging range 430C, the detection target object 410C is included in the imaging range 430C.

In determination of arrangement of detection target objects, it is preferable to consider a viewing angle of an imaging camera, the size of an imaging target, a distance between the imaging target and the camera, and the like, in addition to selection of a region from which a sufficient feature value for securing specific recognition accuracy can be extracted. For example, in a distance relationship between an imaging target, a face, and a terminal indicating an imaging distance between the imaging target and the camera, in the case of a catalog or a menu, it can be considered that a distance between an imaging target and a face is at most about several tens of centimeters and a distance between the target and the smart phone is about several centimeters. Based on the distance relationship, it is possible to appropriately set a distance between detection target objects in consideration of a viewing angle of the camera.

The detection target object may be information about distribution of feature values in an imaging target. The distribution of the feature values represents a distribution of a region where a feature value in an imaging target is large, a region where the feature value is small, a region where the feature value is intermediate, or the like. At least part of the above information is selected so as to be included in a captured image as a detection target object. Further, when the detection target object is set in this way, the distribution of the feature values may be obtained from the captured image by image recognition, and a distribution of feature values which at least partially matches the distribution of the obtained feature values may be retrieved from the database 50 to specify detection target objects.

Further, similarly, the detection target objects for recognition described in the above exemplary embodiment may be evenly arranged in the imaging target.

According to the image recognition apparatus of this exemplary embodiment, the same effects as in the above exemplary embodiment are achieved. Further, since plural detection target objects are set in an imaging target to be arranged uniformly to a certain extent therein and all processing target objects included in the imaging target can be specified by relative positions with respect to the detection target objects, it is possible to reduce the number of detection target objects to be prepared in advance to a necessary minimum to thereby set the detection target objects with high efficiency, while preventing lowering of recognition accuracy.

(Sixth Exemplary Embodiment)

An image recognition apparatus according to an exemplary embodiment of the present invention is different from the image recognition apparatus 100 of the above-described exemplary embodiment in that a detection target object is not set in a portion where a recognition condition easily deteriorates, such as a portion that is easily distorted in a recognition target. For example, when an imaging target is a book, a detection target object is set in a region excluding a curved portion (gutter region) in the vicinity of a binding portion.

Since the image recognition apparatus of this exemplary embodiment has the same configuration as in the image recognition apparatus 100 of the above-described exemplary embodiment in FIG. 3, hereinafter, description thereof will be made with reference to FIG. 3. This exemplary embodiment is different from the above-described exemplary embodiment in a detection target object stored in the database 50.

Figure 14:
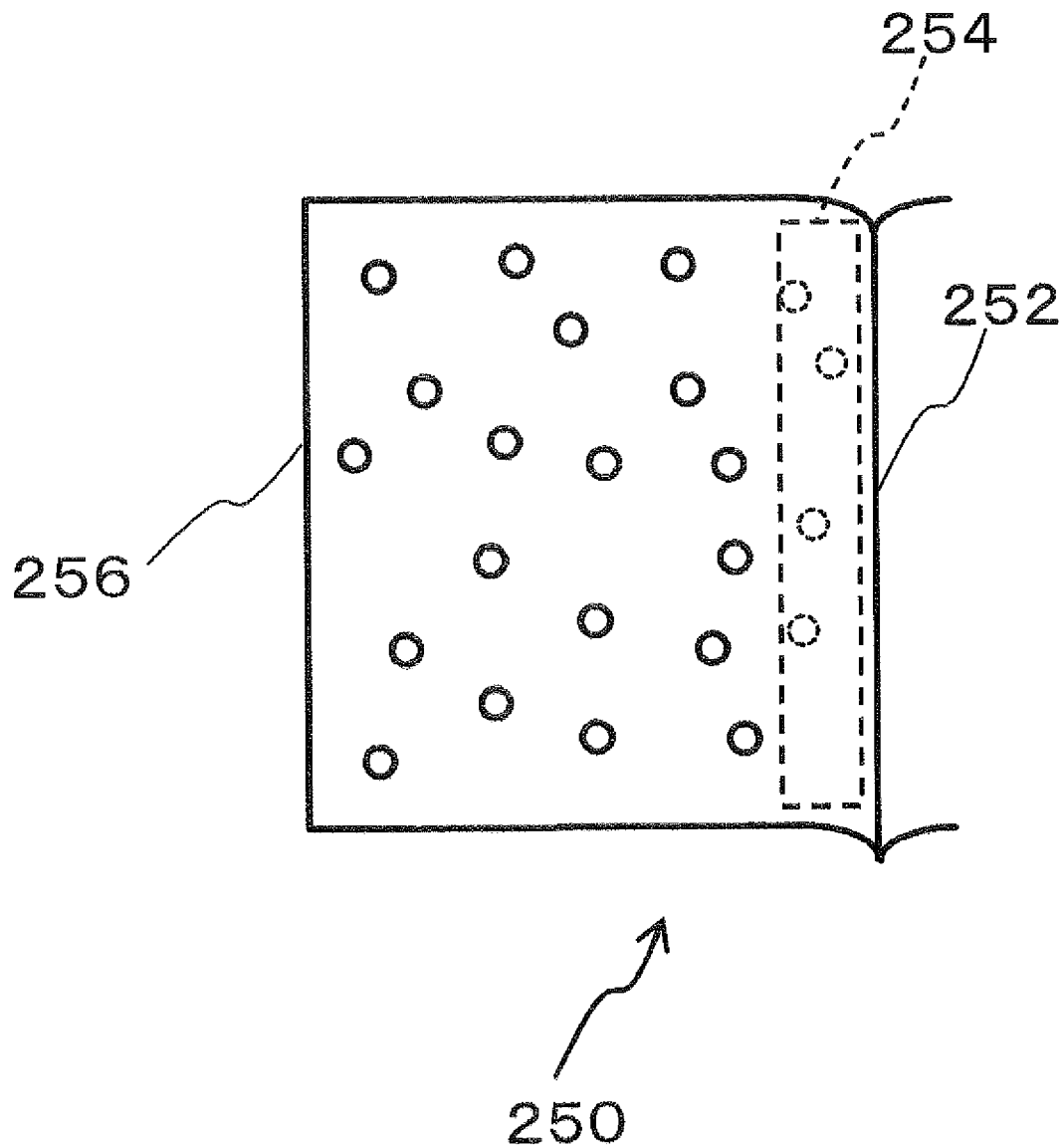
FIG. 14 is a diagram illustrating an area of a detection target object in an image recognition apparatus according to an exemplary embodiment of the present invention.

FIG. 14 is a diagram illustrating a distribution range of a detection target object, in the image recognition apparatus 100 according to the exemplary embodiment of the present invention.

In this exemplary embodiment, when the imaging target is a book 250, it is assumed that at least one detection target object is included therein. In FIG. 14, a case where plural regions (in the figure, indicated by circles) having a feature value including specific detection accuracy are present in an imaging target is shown as an example. As shown in the figure, plural regions capable of being detected by imaging may be evenly present over an entire surface of the book 250 in reality.

However, in the case of the book 250, as understood from the figure, a gutter region 254 in the vicinity of a binding portion 252 is curved on a sheet, compared with a fore-edge 256 on a spread side opposite to the binding portion 252. Thus, in the gutter region 254, distortion, light reflection, or the like easily occurs, and thus, there is a high possibility that recognition accuracy of a captured image is lowered.

Accordingly, in this exemplary embodiment, at least one detection target object is set in a region excluding the gutter region 254 in the vicinity of the binding portion 252, among plural regions that are present on the entire surface of the book 250.

As described above, according to the image recognition apparatus of this exemplary embodiment, the same effects as in the above exemplary embodiment are achieved. Further, when an imaging target is a book, since a detection target object is set to be included in a region excluding a gutter region in the vicinity of a binding portion, it is possible to prevent lowering of recognition accuracy.

(Seventh Exemplary Embodiment)

An image recognition apparatus according to an exemplary embodiment of the present invention is different from the image recognition apparatus 100 of the above-described exemplary embodiment in that processing target objects of an image in which the plural processing target objects are represented in a list form are individually specified.

Since the image recognition apparatus of this exemplary embodiment has the same configuration as in the image recognition apparatus 100 of the above-described exemplary embodiment in FIG. 3, hereinafter, description thereof will be made with reference to FIG. 3. This exemplary embodiment is different from the above-described exemplary embodiment in a detection target object stored in the database 50.

Figure 15:
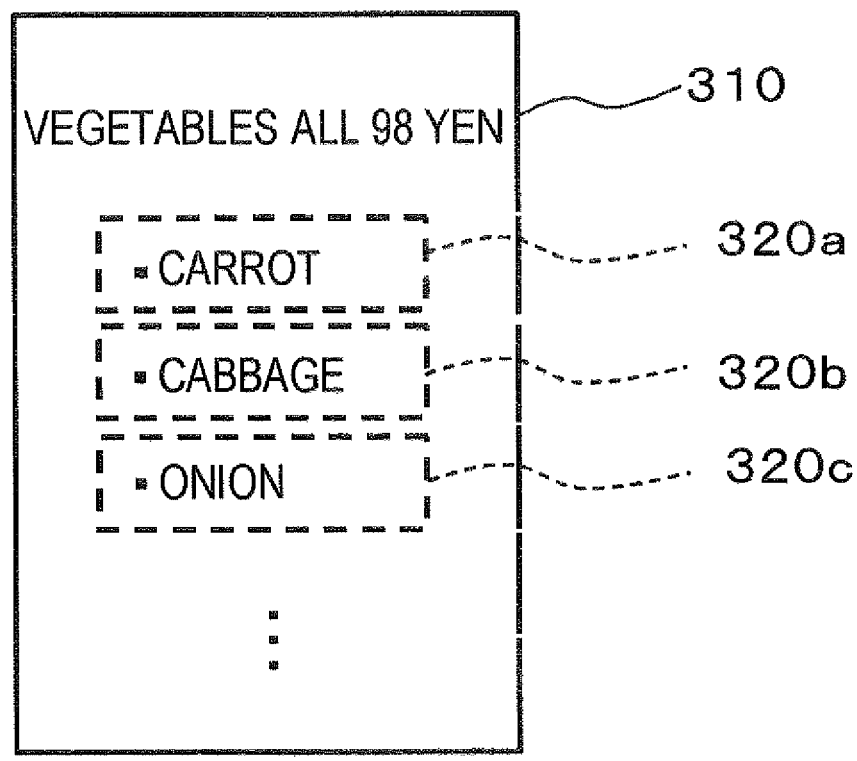
FIG. 15 is a diagram illustrating a recognition process in an image recognition apparatus according to an exemplary embodiment of the present invention.

FIG. 15 is a diagram illustrating a recognition process in an image recognition apparatus according to the exemplary embodiment of the present invention.

As shown in FIG. 15, in the image recognition apparatus of this exemplary embodiment, an image 310 may include plural processing target objects (images including plural character strings) 320a, 320b, and 320c which are represented in a list form. In this exemplary embodiment, a detection target object may be set as feature information (for example, feature points and their positions) in a region including at least a part of a list including the plural processing target objects 320a, 320b, and 320c, for example. Alternatively, feature information in a region in an imaging target other than the list may be set as the detection target object.

The object specifying unit 102 searches the database 50 to find a detection target object of which feature information at least partially matches feature information of a region extracted by image recognition from the database 50. Further, the processing unit 104 specifies, based on object position data indicating relative positions between a detection target object (a feature point and its relative position) included in the image 310 including the list including the plural processing target objects 320a, 320b, and 320c, and the processing target objects 320a, 320b, and 320c in the list form, the processing target objects 320a, 320b, and 320c which are present at the relative positions from the position of the found detection target object. Further, the processing unit 104 obtains display positions of markers for marker display processes allocated to the specified processing target objects 320a, 320b, and 320c. Furthermore, the processing unit 104 respectively displays markers corresponding to the character strings 320a, 320b, and 320c of the processing target objects at the obtained display positions.

Here, the specification of the processing target objects may be performed similar to the exemplary embodiment described with reference to FIG. 12.

Further, in the image recognition apparatus of this exemplary embodiment, the marker corresponding to each of the processing target objects in the list form has a user interface function for receiving a predetermined user's operation with respect to the processing target objects.

As described above, the processing unit 104 specifies the respective processing target objects 320a, 320b, and 320c from the captured image including the list including the plural processing target objects 320a, 320b, and 320c, and obtains information corresponding to the specified processing target objects 320a, 320b, and 320c from the database 50.

The processing unit 104 displays a user interface for receiving a predetermined operation with respect to each of the processing target objects 320a, 320b, and 320c at a marker display position, based on information corresponding to the obtained processing target objects 320a, 320b, and 320c.

Figure 16:
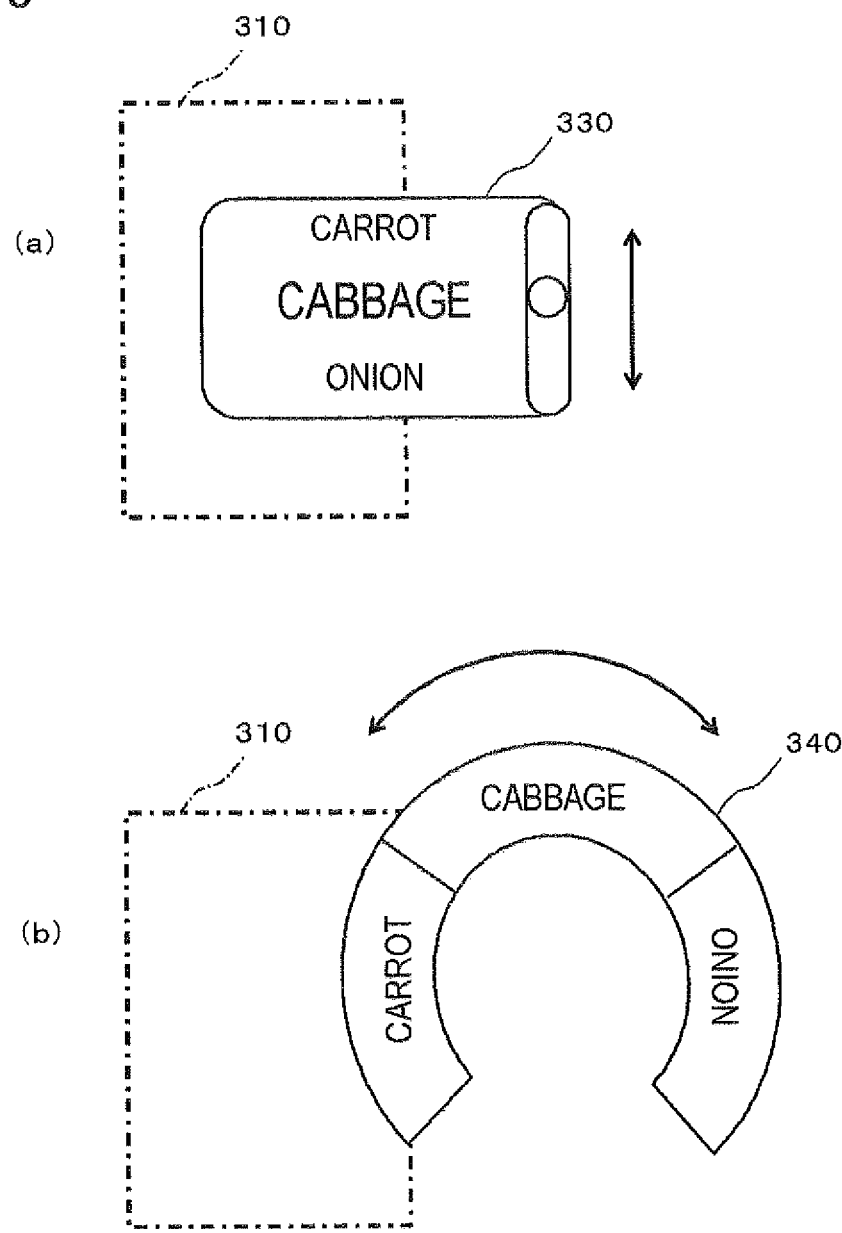
FIG. 16 are diagrams illustrating an example of a graphical user interface of an image recognition apparatus according to an exemplary embodiment of the present invention.

FIG. 16 are diagrams illustrating an example of a graphical user interface of the image recognition apparatus according to this exemplary embodiment.

FIG. 16(*a*) shows an example of a drum-type user interface 330.

The processing unit 104 specifies character strings 320a, 320b, and 320c respectively from an image including plural processing target objects 320a, 320b, and 320c, and obtains information corresponding to the specified processing target objects 320a, 320b, and 320c from the database 50. For example, the processing unit 104 obtains information about a character string corresponding to each processing target object, and displays a user interface 330 for selecting the obtained character string in an image 310 including the list in an overlapping manner.

The character string information may be stored in the database 50 in association with each character string. Alternatively, the processing unit 104 may obtain a display area of each processing target object as the information corresponding to each processing target object, may cut the display area of each processing target object from an image, and may extract and obtain a text corresponding to each processing target object using an optical character reader (OCR) function.

FIG. 16(*b*) shows an example of a jog dial type user interface 340. In this example, a user interface 340 for selecting a character string obtained by the processing unit 104 is also displayed in an image 310 including a list in an overlapping manner.

In this way, according to the image recognition apparatus of this exemplary embodiment, it is possible to individually specify respective elements such as plural character strings included in processing target objects, which is not generally easily recognized, based on feature information of a region having a feature value for obtaining specific recognition accuracy, extracted from an image. Further, in the image recognition apparatus, by imaging a leaflet or the like in which a commodity name list is presented, commodity names in the list may be presented through a user interface. Thus, it is possible to easily select a specific commodity in the list for which an operation is not generally easy.

The image recognition apparatus of the present invention may be a configuration in which arbitrary components of the above-described exemplary embodiments are combined in a range where contradiction does not occur. For example, when a certain catalog is an imaging target, arbitrary components may be employed for combination from the components of the above-described exemplary embodiments according to a state of each image which is a processing target object on each sheet of the catalog, for example, according to an individual state such as a state where an image is small, a state where color of an image is thin (a feature information quantity is small), or a state where a commodity image is buried in a background (not to be easily identified).

Hereinabove, the exemplary embodiments of the present invention have been described with reference to the accompanying drawings, but these exemplary embodiments are only examples, and various configurations other than the above-described exemplary embodiments may be employed.

For example, in the user interface 330 shown in FIG. 16(*a*), the selection of each element may be performed by receiving an operation of touching a slider of a drum on a touch panel. Further, a main body of the smart phone 10 may be longitudinally tilted in a rotation direction of the drum to receive an operation of rotating the drum.

Further, in the user interface 340 shown in FIG. 16(*b*), the selection of each element may be performed by receiving an operation of touching and rotating a jog dial on a touch panel. Further, a main body of the smart phone 10 may be laterally moved in a rotation direction of the jog dial to receive an operation of rotating the jog dial.

Further, in an image recognition apparatus of another exemplary embodiment, the processing unit 104 may control a process allocated to a processing target object according to a scale difference between a detection target object specified by the object specifying unit 102 and a processing target object specified from the detection target object.

For example, if the imaging unit 30 of the smart phone 10 is distant from an imaging target, a detection target object is reflected to be small in a captured image, and if the imaging unit 30 is close thereto, the detection target object is reflected to be large. Here, the detection target object reflected in the captured image may not be seen by a user as in the above-described electron watermark. According to the imaging distance, the detection target object reflected in the captured image also becomes large. That is, according to a reflection size of the detection target object, the position and size of a display process with respect to a processing target object are changed. Further, a relative position or size is also changed.

Accordingly, the relative position of the processing target object with respect to the detection target object is expressed, when a side connecting a certain top of the detection target object with another top of the same detection target object is represented as a vector, as vector data indicated by a relative length with reference to the vector. Further, the position and size of the display process with respect to the processing target object may be specified based on the length of the side which is a reference of the detected detection target object, using the vector data.

Here, the top of the detection target object which is a reference when the processing target object is calculated may be a feature point having a feature which is equal to or higher than a threshold value, obtained from the captured image by image recognition, or may be a feature point of a detection target object obtained by collation of feature information obtained by image recognition and the database 50.

Further, in the above example, an example in which the size or position of the display process with respect to the processing target object is appropriately changed according to the detection target object is shown, but as another example, a content to be displayed may be changed, for example.

For example, when a detection target object is imaged to be small in a captured image, there is a possibility that plural corresponding processing target objects are specified. On the other hand, when a detection target object is imaged to be close-up in a captured image, there is a possibility that only a specific processing target object is specified. Thus, in the image recognition apparatus, when a detection target object in a captured image is small, a process of associating plural processing target objects as a group, such as a process of displaying approximate information for each group of specified plural processing target objects, may be performed. Further, when the detection target object in the captured image is large, a changed process may be performed based on a group attribute of processing target objects to be specified, for example. In this case, for example, a process of displaying detailed information about a specific processing target object may be performed.

In a more specific example, in the case of an application that images a menu in a restaurant and performs a warning display when an allergenic substance that is registered in advance by a user is included in a captured menu image, when a detection target object is small and plural processing target objects are included, that is, when plural menus are included in a screen due to a long imaging distance, a red frame is displayed in a region of the menu including the allergenic substance. On the other hand, when the detection target object is large (when an imaging distance is short and only one specific menu is included in a captured image), the display process may be changed to display a specific allergy name such as "wheat used", in addition to the red frame.

As described above, the present invention has been described with reference to the exemplary embodiments and examples, but the present invention is not limited to the exemplary embodiments and examples. Various modifications capable of being understood by those skilled in the art in the scope of the present invention may be performed in configurations or details of the present invention.

In the present invention, when acquiring and using information relating to a user, it is assumed that the acquisition and use is legally performed.

Hereinafter, examples of reference modes will be described.

1. A processing method of an image recognition apparatus, the method being executed by the image recognition apparatus, the method including:
   specifying a position, in a captured image, of a detection target object which is set in a predetermined arrangement according to a processing target object in an imaging target and has a feature depending on the processing target object, by image recognition; and
   specifying, based on object position data indicating a relative position between the detection target object in the imaging target and the processing target object which is set in a predetermined arrangement according to the imaging target and has a feature depending on the imaging target, the processing target object in the captured image which is present at the relative position from the position of the specified detection target object in the captured image, and executing a process allocated to the specified processing target object.

2. A processing method of an image recognition apparatus, the method being executed by the image recognition apparatus, the method including:

specifying a position, in a captured image, of a detection target object which is set in a predetermined arrangement according to a processing target object in an imaging target and has a feature depending on the processing target object, by image recognition; and specifying, based on object position data in which position information of the detection target object in the imaging target and a processing target object which is set in a predetermined arrangement according to the imaging target and has a feature depending on the imaging target are associated with each other, the associated processing target object in the captured image from the position of the specified detection target object in the captured image, and executing a process allocated to the specified processing target object.

3. The processing method of the image recognition apparatus according to 1 or 2, wherein the detection target object includes a preset region which is easily recognized in the imaging target, according to the processing target object.

4. The processing method of the image recognition apparatus according to any one of 1 to 3, wherein the detection target object includes at least a part of a region including the vicinity of the processing target object.

5. The processing method of the image recognition apparatus according to any one of 1 to 4, wherein the detection target object is associated with the plural processing target objects.

6. The processing method of the image recognition apparatus according to any one of 1 to 5, wherein the detection target object at least includes information for detection.

7. The processing method of the image recognition apparatus according to any one of 1 to 6, wherein the imaging target is a book, and the detection target object is included in a region excluding a gutter region in the vicinity of a binding portion of the book.

8. The processing method of the image recognition apparatus according to any one of 1 to 7, wherein the process includes at least one of display of a marker, a speech balloon or a menu, realization of a user interface function, and transmission of a detection result to a server.

9. The processing method of the image recognition apparatus according to 8, wherein the process includes a process of realizing a user interface function for enabling plural processing target objects to be selectively processed.

10. The processing method of the image recognition apparatus according to any one of 1 to 9, the method being executed by the image recognition apparatus, the method further including controlling the process allocated to the processing target object according to a scale difference between the specified detection target object and the processing target object specified from the detection target object.

11. The processing method of the image recognition apparatus according to any one of 1 to 10, wherein the detection target object is arranged in the imaging target so that at least one detection target object is included in the captured image.

12. The processing method of the image recognition apparatus according to any one of 1 to 11, wherein the object position data uses information about positions, in the captured image, of plural feature points included in the detection target object as information indicating a position of the detection target object, the method being executed by the image recognition apparatus, the method further including specifying the processing target object in the imaging target from the positions, in the imaging target, of the plural feature points of the specified detection target object based on the object position data.

13. The processing method of the image recognition apparatus according to any one of 1 to 12, wherein the image recognition apparatus is a portable terminal, a server apparatus capable of communicating with the portable terminal, or a combination thereof.

14. A program for causing a computer to execute:

a procedure for specifying a position, in a captured image, of a detection target object which is set in a predetermined arrangement according to a processing target object in an imaging target and has a feature depending on the processing target object, by image recognition; and a procedure for specifying, based on object position data indicating a relative position between the detection target object in the imaging target and the processing target object which is set in a predetermined arrangement according to the imaging target and has a feature depending on the imaging target, the processing target object in the captured image which is present at the relative position from the position of the specified detection target object in the captured image, and executing a process allocated to the specified processing target object.

15. A program for causing a computer to execute:

a procedure for specifying a position, in a captured image, of a detection target object which is set in a predetermined arrangement according to a processing target object in an imaging target and has a feature depending on the processing target object, by image recognition; and a procedure for specifying, based on object position data in which position information of the detection target object in the imaging target and the processing target object which is set in a predetermined arrangement according to the imaging target and has a feature depending on the imaging target are associated with each other, the associated processing target object in the captured image from the position of the specified detection target object in the captured image, and executing a process allocated to the specified processing target object.

16. The program according to 14 or 15, wherein the detection target object includes a preset region which is easily detected in the imaging target, according to the processing target object.

17. The program according to any one of 14 to 16, wherein the detection target object includes at least a part of a region including the vicinity of the processing target object.

18. The program according to any one of 14 to 17, wherein the detection target object is associated with the plural processing target objects.

19. The program according to any one of 14 to 18, wherein the detection target object at least includes information for detection.

20. The program according to any one of 14 to 19, wherein the imaging target is a book, and the detection target object is included in a region excluding a gutter region in the vicinity of a binding portion of the book.

21. The program according to any one of 14 to 20, wherein the process includes at least one of display of a marker, a speech balloon or a menu, realization of a user interface function, and transmission of a detection result to a server.

22. The program according to 21, wherein the process includes a process of realizing a user interface function for enabling plural processing target objects to be selectively processed.

23. The program according to any one of 14 to 22, causing the computer to further execute:
a procedure for controlling the process allocated to the processing target object according to a scale difference between the specified detection target object and the processing target object specified from the detection target object, in the procedure of executing the allocated process.

24. The program according to any one of 14 to 23, wherein the detection target object is arranged in the imaging target so that at least one detection target object is included in the captured image.

25. The program according to any one of 14 to 24, wherein the object position data uses information about positions, in the captured image, of plural feature points included in the detection target object as information indicating a position of the detection target object,
the program causing the computer to further execute:
a procedure for specifying the processing target object in the imaging target from the positions, in the imaging target, of the plural feature points of the specified detection target object based on the object position data, in the procedure of executing the allocated process.

26. The program according to any one of 14 to 25, wherein an image recognition apparatus realized as the computer executes the program is a portable terminal, a server apparatus capable of communicating with the portable terminal, or a combination thereof.

This application claims priority based on Japanese Patent Application No. 2013-115029 filed May 31, 2013, the disclosure of which is entirely incorporated herein by reference.

What is claimed is:

1. An image recognition apparatus comprising:
a first memory configured to store a plurality of pieces of position data, wherein each piece of the position data indicates a relative position between a detection target object and each of a plurality of products, the plurality of products including a first product and a second product;
a second memory configured to store instructions; and
at least one processor configured to execute the instructions to:
acquire image data which includes the detection target object positioned relative to the first product and the second product in a manner consistent with the plurality of pieces of position data;
recognize, by image recognition, the detection target object in the image data based on at least two feature points of the detection target object in the image data, wherein a first feature point among the at least two feature points is common to the detection target object and the first product, and wherein a second feature point among the at least two feature points is common to the detection target object and the second product;
by accessing the first memory, determine the plurality of pieces of position data stored in association with the at least two feature points in the first memory on the basis of the recognized detection target object;
determine the first product and the second product in the image data on the basis of respective pieces of the position data determined by accessing the first memory; and
execute a process based on the determination of the first product and the second product.

2. The image recognition apparatus according to claim 1, wherein the at least two feature points of the detection target object in the image data include at least a part of a region including a vicinity of the first product or the second product.

3. The image recognition apparatus according to claim 1, wherein the at least two feature points of the detection target object in the image data at least include information for recognition.

4. The image recognition apparatus according to claim 1, wherein the image data including the first product and the second product is included in a book, and the at least two feature points of the detection target object in the image data are included in a region excluding a gutter region in a vicinity of a binding portion of the book.

5. The image recognition apparatus according to claim 1, wherein the at least one processor is further configured to execute the instructions to: after recognizing the at least two feature points by image recognition, perform a process that includes at least one of: display at least one of a marker, a speech balloon, and a menu; realization of a user interface function; and transmission of a recognition result to a server.

6. The image recognition apparatus according to claim 5, wherein the process includes realizing a user interface function for ordering plural products recognized in the acquired image data.

7. The image recognition apparatus according to claim 1, wherein the at least one processor is further configured to execute the instructions to: control a process corresponding to the first product or the second product in the image data based on a scale difference between the detection target object and the first product or the second product.

8. The image recognition apparatus according to claim 1, wherein a plurality of features of the detection target object are arranged with respect to the first product or the second product so that the at least two feature points of the detection target object are included in the acquired image.

9. The image recognition apparatus according to claim 1, wherein each piece of the position data indicates a position of each of the at least two feature points of the detection target object in the acquired image, and the at least one processor is configured to further execute the instructions to: determine the first product or the second product in the image data based on the position data.

10. The image recognition apparatus according to claim 1, wherein the image recognition apparatus comprises a portable terminal, a server apparatus capable of communicating with the portable terminal, or a combination thereof.

11. A processing method of an image recognition apparatus, the method being executed by the image recognition apparatus, the method comprising:
storing, in a memory, a plurality of pieces of position data, wherein each piece of the position data indicates a relative position between a detection target object and each of a plurality of products, the plurality of products including a first product and a second product;

acquiring image data which includes the detection target object positioned relative to the first product and the second product in a manner consistent with the plurality of pieces of position data;

recognizing, by image recognition, the detection target object in the image data based on at least two feature points of the detection target object in the image data, wherein a first feature point among the at least two feature points is common to the detection target object and the first product, and wherein a second feature point among the at least two feature points is common to the detection target object and the second product;

by accessing the memory, determining the plurality of pieces of position data which are stored in association with the at least two features points in the memory on the basis of the recognized detection target object;

determining the first product and the second product in the image data on the basis of respective pieces of the position data determined by accessing the memory; and executing a process based on the determination of the first product and the second product.

12. A computer program product comprising a non-transitory computer readable medium storing instructions adapted to enable a hardware processor of a computer to implement a wireless communication system by performing operations comprising:

storing, in a memory, a plurality of pieces of position data, wherein each piece of the position data indicates a relative position between a detection target object and each of a plurality of products, the plurality of products including a first product and a second product;

acquiring image data which includes the detection target object positioned relative to the first product and the second product in a manner consistent with the plurality of pieces of position data;

recognizing, by image recognition, the detection target object in the image data based on at least two feature points of the detection target object in the image data, wherein a first feature point among the at least two feature points is common to the detection target object and the first product, and wherein a second feature point among the at least two feature points is common to the detection target object and the second product;

by accessing the memory, determining the plurality of pieces of position data which are stored in association with the at least two features points in the memory on the basis of the recognized detection target object;

determining the first product and the second product in the image data on the basis of respective pieces of the position data determined by accessing the memory; and executing a process based on the determination of the first product and the second product.

13. The image recognition apparatus according to claim 1, wherein the detection target object includes a plurality of portions of each of the plurality of products.

14. The image recognition apparatus according to claim 1, wherein the detection target object is part of an original scene in the image data, the original scene including the first product or the second product available for purchase.

15. The image recognition apparatus according to claim 1, wherein the at least one processor configured to execute the instructions to: after determining the plurality of products, display a selectable icon for ordering the first product or the second product.

16. The image recognition apparatus according to claim 15, wherein the selectable icon is superimposed on the image data after determining the first product or the second product.

17. The image recognition apparatus according to claim 1, wherein the process includes a process of ordering the first product or the second product.

* * * * *